United States Patent
Kanno

(10) Patent No.: US 11,392,323 B2
(45) Date of Patent: Jul. 19, 2022

(54) MEMORY SYSTEM AND METHOD OF CONTROLLING NONVOLATILE MEMORY

(71) Applicant: Kioxia Corporation, Tokyo (JP)

(72) Inventor: Shinichi Kanno, Ota (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/016,762

(22) Filed: Sep. 10, 2020

(65) Prior Publication Data

US 2021/0279001 A1    Sep. 9, 2021

(30) Foreign Application Priority Data

Mar. 3, 2020  (JP) .............................. JP2020-035746

(51) Int. Cl.
*G06F 3/06* (2006.01)

(52) U.S. Cl.
CPC .......... *G06F 3/0659* (2013.01); *G06F 3/0604* (2013.01); *G06F 3/0652* (2013.01); *G06F 3/0653* (2013.01); *G06F 3/0656* (2013.01); *G06F 3/0679* (2013.01)

(58) Field of Classification Search
CPC ...... F06F 3/0604; F06F 3/0679; F06F 3/0659; G06F 3/0604; G06F 3/0679; G06F 3/0659

See application file for complete search history.

(56) References Cited

U.S. PATENT DOCUMENTS

| | | | | |
|---|---|---|---|---|
| 8,392,633 | B2 * | 3/2013 | Gulati | G06F 9/5011 710/36 |
| 2016/0266934 | A1 * | 9/2016 | Rimoni | G06F 3/0679 |
| 2018/0336150 | A1 * | 11/2018 | Jinn | G06F 13/374 |
| 2019/0004702 | A1 | 1/2019 | Chen et al. | |
| 2019/0065086 | A1 * | 2/2019 | Margetts | G06F 1/329 |
| 2019/0080773 | A1 | 3/2019 | Kondo | |
| 2019/0087129 | A1 | 3/2019 | You | |
| 2019/0121546 | A1 | 4/2019 | La Fratta et al. | |
| 2019/0258514 | A1 * | 8/2019 | Miao | G06F 9/4881 |
| 2019/0286338 | A1 | 9/2019 | Noda | |
| 2019/0303309 | A1 * | 10/2019 | Sahoo | H04L 49/90 |
| 2020/0326890 | A1 * | 10/2020 | Benisty | G06F 9/30101 |
| 2020/0364163 | A1 * | 11/2020 | Schauer | G06F 13/28 |
| 2020/0409874 | A1 * | 12/2020 | Moss | G06F 12/0246 |
| 2021/0200481 | A1 * | 7/2021 | Buxton | G06F 3/0625 |

FOREIGN PATENT DOCUMENTS

| | | |
|---|---|---|
| JP | 2019-53795 A | 4/2019 |
| JP | 2019-164487 A | 9/2019 |

* cited by examiner

*Primary Examiner* — Edward J Dudek, Jr.

(74) *Attorney, Agent, or Firm* — Oblon, McClelland, Maier & Neustadt, L.L.P.

(57) ABSTRACT

According to one embodiment, a memory system manages a plurality of first weights that correspond to the plurality of queues, and a plurality of second weights that correspond to the plurality of queues. The memory system selects a queue of a largest or smallest second weight, of the plurality of queues, as a queue of a highest priority, and starts execution of a command stored in the selected queue. The memory system updates the second weight corresponding to the selected queue by subtracting the first weight corresponding to the selected queue from the second weight corresponding to the selected queue or by adding the first weight corresponding to the selected queue to the second weight corresponding to the selected queue.

19 Claims, 15 Drawing Sheets

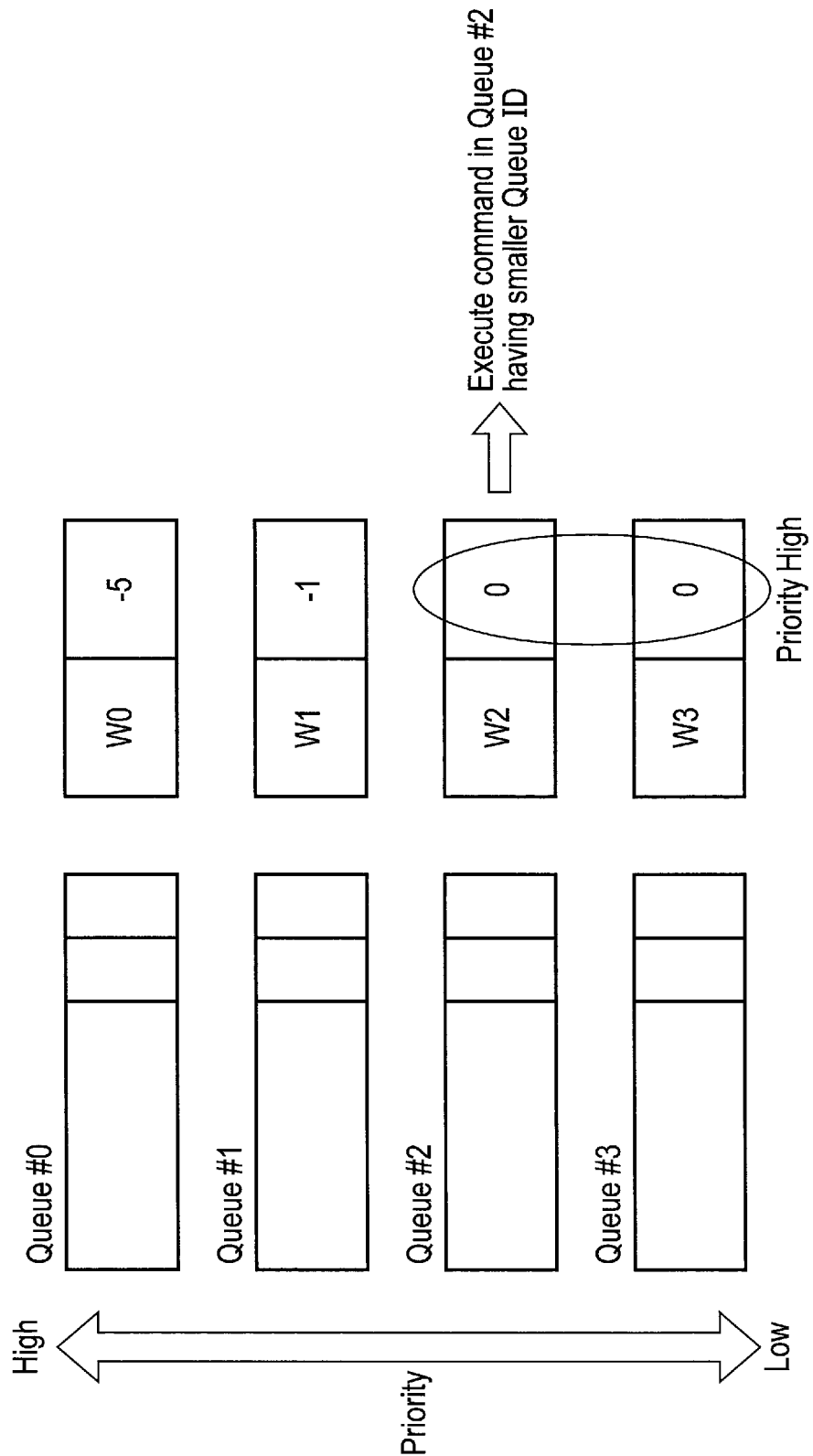
F I G. 7

Recovery of second weight

| | Time t | t+1 | t+2 | t+3 | t+4 | .... |
|---|---|---|---|---|---|---|
| W0 | -10 | -9 | -8 | -7 | -6 | .... |
| W1 | -5 | -4 | -3 | -2 | -1 | .... |
| W2 | -3 | -2 | -1 | 0 | 0 | .... |
| W3 | 0 | 0 | 0 | 0 | 0 | .... |

F I G. 8

Consumption of second weight and recovery of second weight

| | Time t | t+1 | t+2 | t+3 | t+4 | .... |
|---|---|---|---|---|---|---|
| W0 | -10 | -9 | -8 | -7 | -6 | .... |
| W1 | -5 | -4 | -3 | -2 | -8 (w=7) | .... |
| W2 | -3 | -2 | -7 (w=6) | -6 | -5 | .... |
| W3 | 0 | -2 (w=3) | -1 | -3 (w=3) | -2 | .... |

F I G. 9

Consumption of second weight and recovery of second weight

|    | Time t | t+1        | t+2        | .... |
|----|--------|------------|------------|------|
| W0 | -9     | -8         | -6         | .... |
| W1 | -5     | -4         | -2         | .... |
| W2 | -3     | -2         | -8 (w=6)   | .... |
| W3 | 0      | -3 (w=3)   | -1         | .... |

Continue execution of program command

|    | Time t | t+1 |
|----|--------|-----|
| W0 | [P]  -5 | [P]  -4 |
| W1 | R  -6 | R  -5 |
| W2 | R  -7 | R  -6 |

☐ : Command being executed

F I G. 12

Suspend execution of program command

Restart execution of program command

|    | Time t | t+1 | t+2 | t+3 |
|----|--------|-----|-----|-----|
| W0 | [P]  -5 | P  -4 Suspend | P  -3 Suspend | [P]  -2 |
| W1 | R  -4 | [R]  -6 (w=3) | -5 | -4 |
| W2 | R  -4 | R  -3 | [R]  -5 (w=3) | -4 |

☐ : Command being executed

F I G. 13

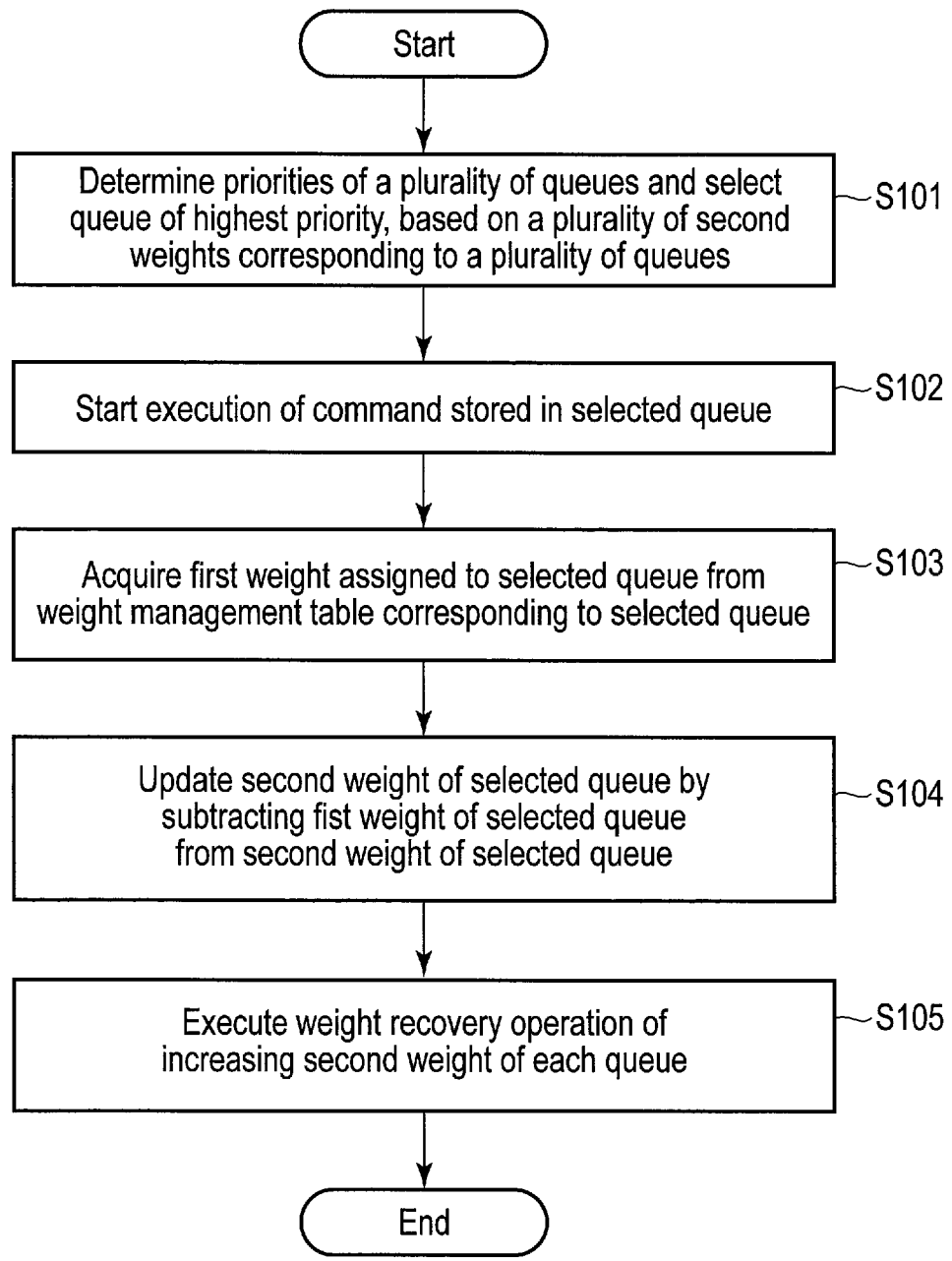
F I G. 15

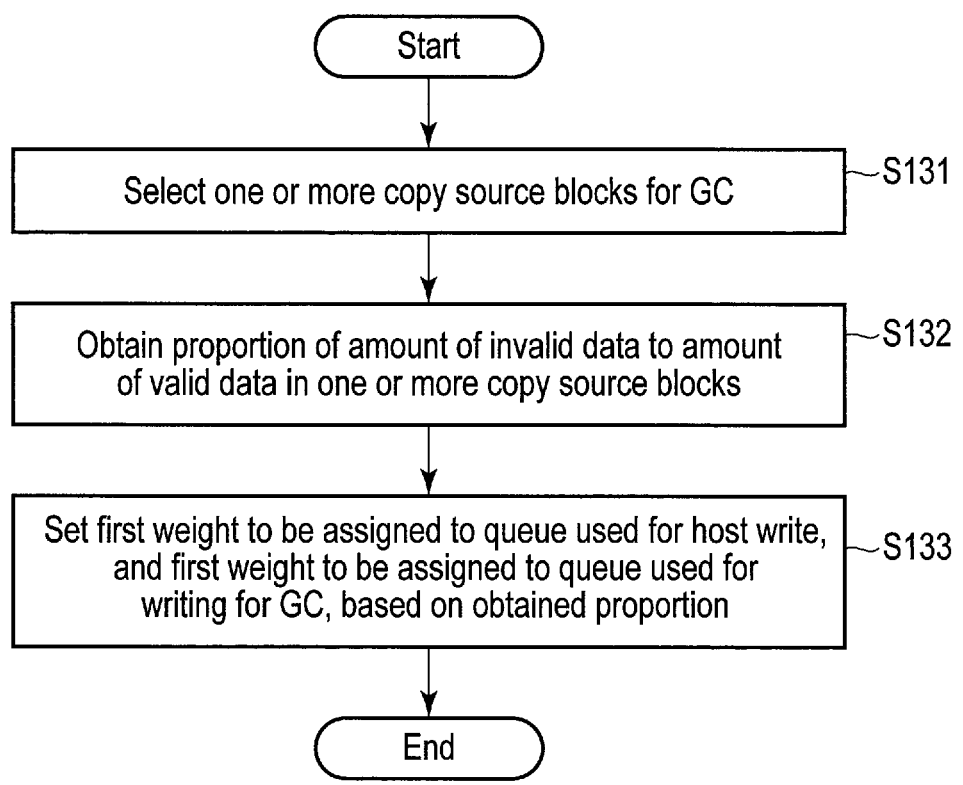
F I G. 18

MEMORY SYSTEM AND METHOD OF CONTROLLING NONVOLATILE MEMORY

CROSS-REFERENCE TO RELATED APPLICATIONS

This application is based upon and claims the benefit of priority from Japanese Patent Application No. 2020-035746, filed Mar. 3, 2020, the entire contents of which are incorporated herein by reference.

FIELD

Embodiments described herein relate generally to a nonvolatile memory control technology.

BACKGROUND

In recent years, memory systems comprising nonvolatile memories are widely prevailing. A solid state drive (SSD) including a NAND flash memory is known as such a memory system.

The memory system such as SSD is used as a storage device of various host computing systems such as data center servers.

In the memory system such as SSD, implementation of a new technology for flexibly controlling access to the nonvolatile memory is required.

BRIEF DESCRIPTION OF THE DRAWINGS

FIG. 7 is a diagram illustrating an operation of selecting the queue of the highest priority from two or more queues of the same priority.

FIG. 8 is a table illustrating a weight recovery operation executed each time a certain time elapses or each time a command is executed.

FIG. 9 is a table illustrating a weight consumption operation of updating (consuming) the second weight of the queue selected as the queue of the highest priority, and the weight recovery operation of recovering the second weight of each queue.

FIG. 12 is a diagram illustrating an operation of continuing execution of a preceding program command.

FIG. 13 is a diagram illustrating an operation of restarting execution of the preceding program command after suspending the executing the preceding program command.

FIG. 15 is a flowchart illustrating a procedure of a scheduling operation executed in the memory system according to the embodiment.

FIG. 18 is a flowchart illustrating a procedure of an operation of setting the first weight to be assigned to the first queue used to write the data from the host and the second weight to be assigned to the second queue used to write the data to be copied for garbage collection, which is executed in the memory system according to the embodiment.

DETAILED DESCRIPTION

Various embodiments will be described hereinafter with reference to the accompanying drawings.

In general, according to one embodiment, a memory system comprises a nonvolatile memory and a controller electrically connected to the nonvolatile memory and configured to control the nonvolatile memory. The controller manages a plurality of queues where a plurality of commands to access the nonvolatile memory are stored, a plurality of first weights that correspond to the plurality of queues, and a plurality of second weights that correspond to the plurality of queues, respectively. The second weight corresponding to a queue of the plurality of queues is updated to a value obtained by subtracting the first weight corresponding to the queue from the second weight corresponding to the queue or by adding the first weight corresponding to the queue to the second weight corresponding to the queue, when execution of a command stored in the queue is started. The controller selects a queue of a largest or smallest second weight, of the plurality of queues, as a queue of a highest priority. The controller starts execution of a command stored in the selected queue. The controller updates the second weight corresponding to the selected queue by subtracting the first weight corresponding to the selected queue from the second weight corresponding to the selected queue or by adding the first weight corresponding to the selected queue to the second weight corresponding to the selected queue.

Figure 1:
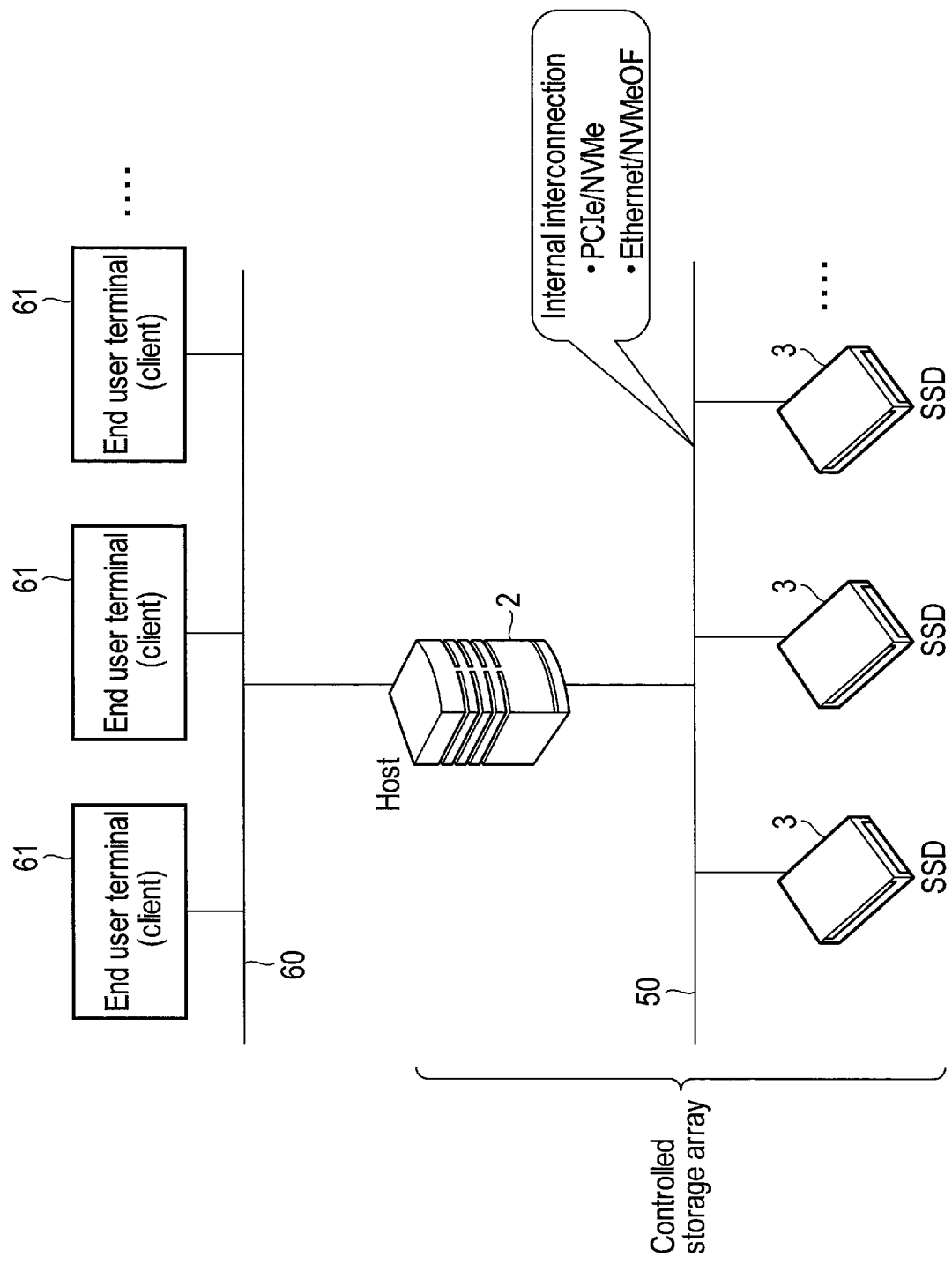
FIG. 1 is a block diagram illustrating a relationship between a host and a memory system of the embodiment.

FIG. 1 is a block diagram illustrating a relationship between a host and a memory system of the embodiment.

The memory system is a semiconductor storage device configured to write data to a nonvolatile memory and to read data from the nonvolatile memory. This memory system is implemented as a solid state drive (SSD) 3 including a NAND flash memory.

A host (i.e., host device) 2 is configured to control a plurality of SSDs 3. The host 2 can be implemented by an information processing apparatus configured to use a storage array including a plurality of SSDs 3 as a storage. This information processing apparatus may be a personal computer or a server computer.

The SSD 3 may be used as one of a plurality of storage devices provided in a storage array. The storage array may be connected to the information processing apparatus such as a server computer via a cable or a network. The storage array may comprise a controller which controls a plurality of storage devices in the storage array. When the SSD 3 is applied to the storage array, the controller of the storage array may function as a host of the SSD 3.

An example that the information processing apparatus such as the server computer functions as a host 2 will be described below.

The host (i.e., server) 2 and the plurality of SSDs 3 are interconnected via an interface 50 (i.e., internal interconnection). PCI Express (PCIe) (registered trademark), NVM Express (NVMe) (registered trademark), Ethernet (registered trademark) or NVMe over Fabrics (NVMeOF) can be used as an interface 50 for the interconnection. However, the interface 50 is not limited to these examples.

A typical example of the server computer which functions as the host 2 is a server computer (hereinafter referred to as a server) in a data center.

In a case where the host 2 is implemented by the server in the data center, the host (server) 2 may be connected to a plurality of end user terminals (clients) 61 via a network 60. The host 2 can provide various services to the end user terminals 61.

Examples of services which can be provided by the host (server) 2 are (1) Platform as a Service (PaaS) which provides a system development platform to each client (each end user terminal 61), (2) Infrastructure as a Service (IaaS) which provides an infrastructure such as a virtual server to each client (each end user terminal 61), and the like.

A plurality of virtual machines may be run on a physical server which functions as the host 2. Each of the virtual machines which runs on the host 2 can function as a virtual server configured to provide various services to the client (end user terminal 61) corresponding to the virtual machine. In each virtual machine, an operating system and a user application that are used by the corresponding end user terminal 61 are run. The operating system corresponding to each virtual machine includes an I/O service. The I/O service may be a block I/O service based on a logical block address (LBA) or a key-value store service.

In the operating system corresponding to each virtual machine, the I/O service issues I/O commands (a write command and a read command) in response to a request for writing or reading of data from the user application. The I/O commands are sent to one or more submission queues in the host 2.

A controller of the SSD 3 receives the I/O commands (write command and read command) from the host 2, controls the nonvolatile memory in the SSD 3, based on the received write command and read command, and executes writing data to the nonvolatile memory and reading data from the nonvolatile memory.

Figure 2:
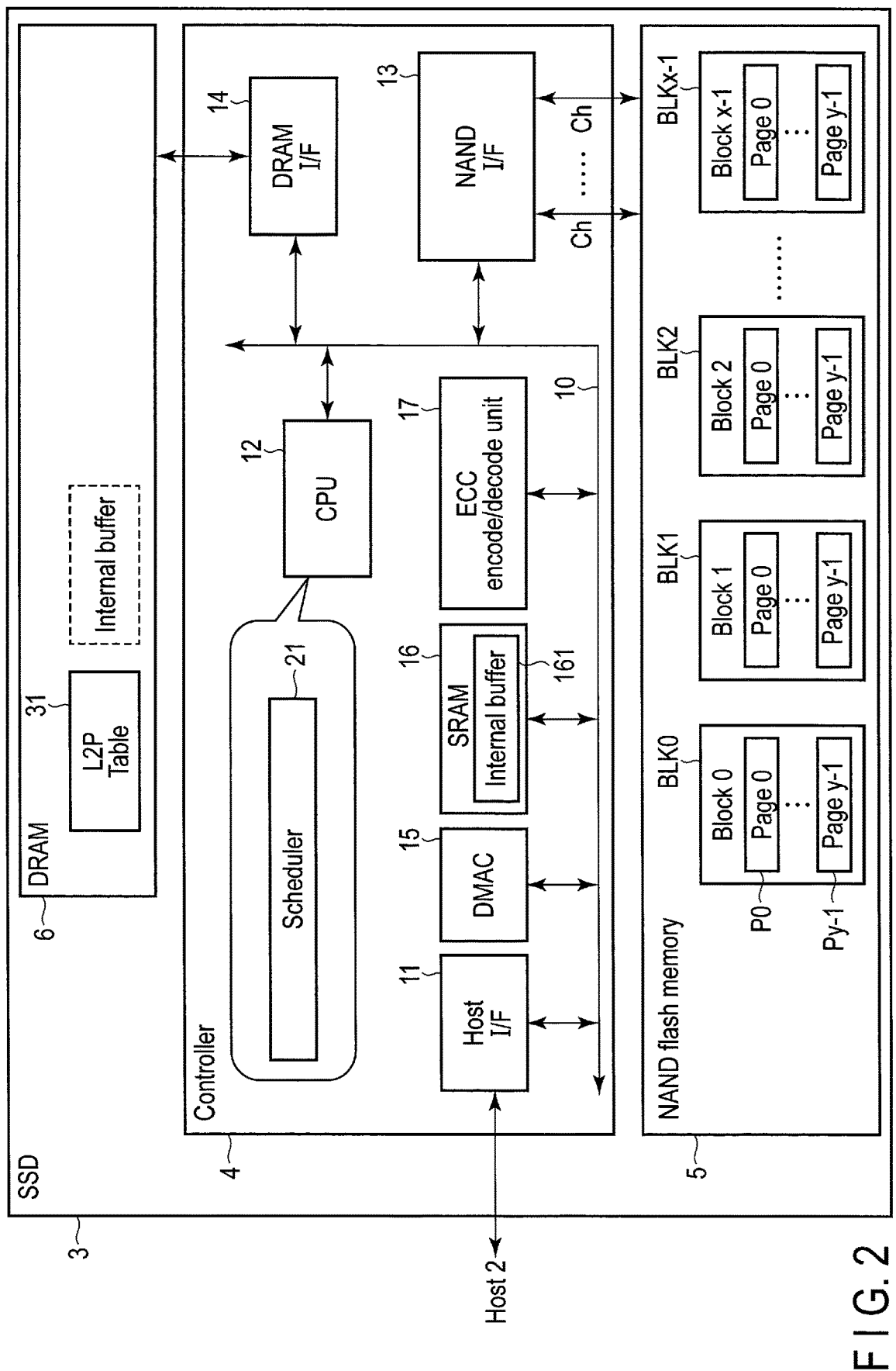
FIG. 2 is a block diagram illustrating a configuration example of the memory system of the embodiment.

FIG. 2 illustrates a configuration example of the SSD 3.

The SSD 3 comprises a controller 4 and a nonvolatile memory (for example, a NAND flash memory 5). The SSD 3 may also comprise a random access memory, for example, a DRAM 6.

The NAND flash memory 5 includes a memory cell array including a plurality of memory cells arranged in a matrix form. The NAND flash memory 5 may be a NAND flash memory having a two-dimensional structure or may be a NAND flash memory having a three-dimensional structure.

The memory cell array of the NAND flash memory 5 includes a plurality of blocks BLK0 to BLKx-1. Each of the blocks BLK0 to BLKx-1 includes a plurality of pages (in this case, pages P0 to Py-1). Each of the blocks BLK0 to BLKx-1 is a unit for a data erase operation for erasing data. Blocks are often referred to as "erase blocks", "physical blocks", or "physical erase blocks". Each of the pages P0 to Py-1 is a unit for a data write operation and a data read operation.

The controller 4 is electrically connected to the NAND flash memory 5 which is a nonvolatile memory via a NAND interface 13 such as Toggle NAND flash interface or Open NAND Flash Interface (ONFI). The controller 4 operates as a memory controller configured to control the NAND flash memory 5. The controller 4 may be implemented by a circuit such as a System-on-a-chip (SoC).

Figure 3:
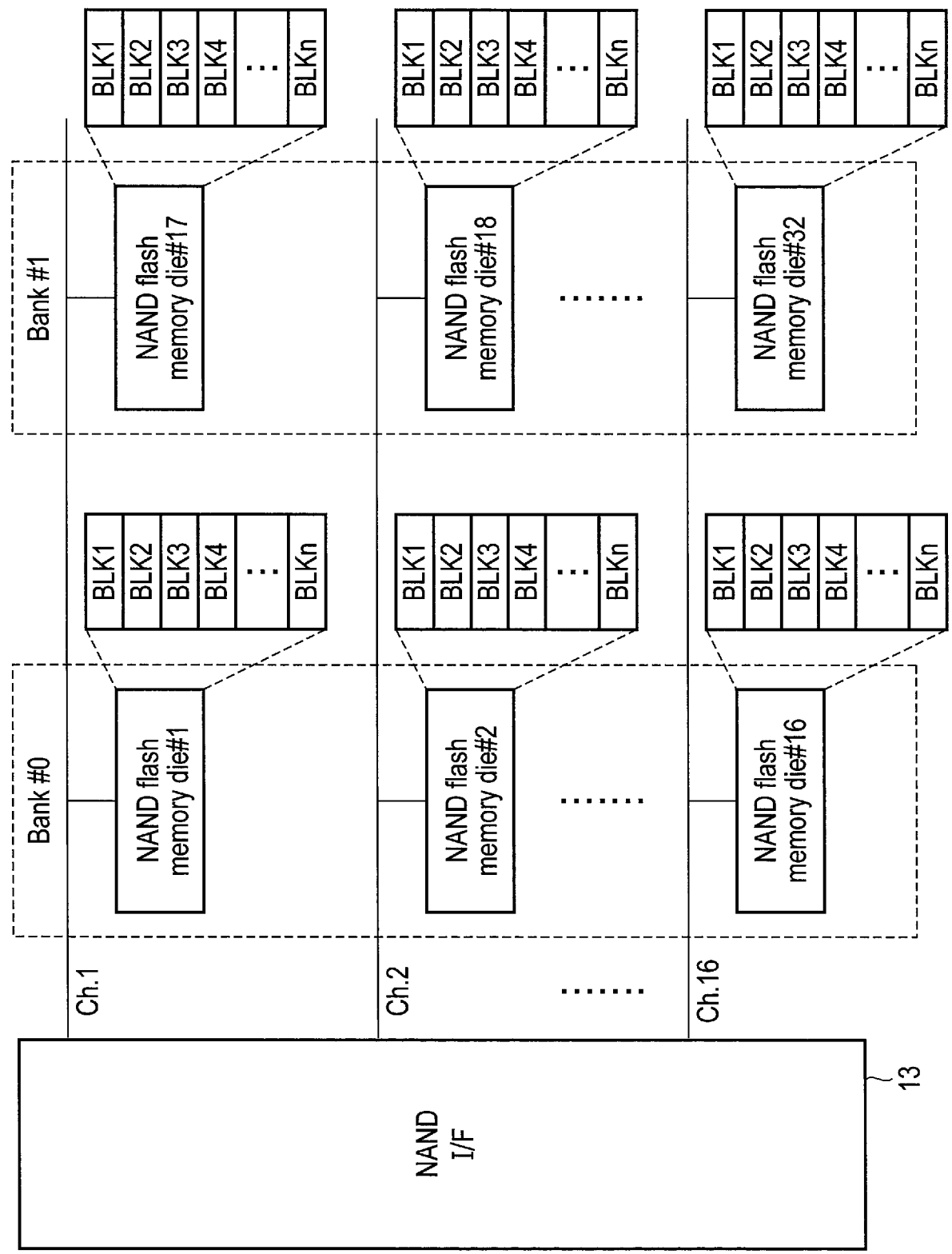
FIG. 3 is a block diagram illustrating a relationship between a plurality of channels and a plurality of NAND flash memory dies, which are used in the memory system according to the embodiment.

As illustrated in FIG. 3, the NAND flash memory 5 may include a plurality of NAND flash memory dies. Each of the individual NAND flash memory dies can operate independently. For this reason, the NAND flash memory dies function as units capable of parallel operations. FIG. 3 illustrates a case where sixteen channels Ch.1 to Ch.16 are connected to the NAND interface 13 and two NAND flash memory dies are connected to each of sixteen channels Ch.1 to Ch.16. In this case, sixteen NAND flash memory dies #1 to #16 connected to the channels Ch.1 to Ch.16 may be constructed as bank #0 and the remaining sixteen NAND flash memory dies #17 to #32 connected to the channels Ch.1 to Ch.16 may be constructed as bank #1. The bank functions as a unit that urges a plurality of memory dies to execute the parallel operation by bank interleaving. In the configuration example shown in FIG. 2, a maximum of thirty-two NAND flash memory dies can be operated in parallel by sixteen channels and the bank interleaving using two banks.

Next, the configuration of the controller 4 illustrated in FIG. 2 will be described.

The controller 4 can function as a flash translation layer (FTL) configured to execute data management and block management of the NAND flash memory 5. The data management executed by the FTL includes (1) management of mapping information indicative of correspondences between logical addresses and physical addresses of the NAND flash memory 5, (2) a process for concealing restrictions of the NAND flash memory 5 (for example, read/write operations in units of pages and an erase operation in units of blocks), and the like. The logical address is an address used by the host 2 to designate a logical address in the logical address space. A logical block address (LBA) is normally used as the logical address.

The management of mapping between each of the logical addresses used by the host 2 to access the SSD 3 and each of the physical addresses of the NAND flash memory 5 is executed by using an address translation table (i.e., a logical-to-physical address translation table: L2P table) 31. The controller 4 may manage the mapping between each of the logical addresses and each of the physical addresses in units of predetermined management sizes, by using the L2P table 31. A physical address corresponding to a certain logical address is indicative of the latest physical storage location where the data corresponding to the logical address is written, in the NAND flash memory 5. The L2P table 31 may be loaded from the NAND flash memory 5 into the DRAM 6 at power-on of the SSD 3.

The block management includes management of defective blocks, wear leveling, garbage collection (GC), and the like. The wear leveling is an operation for making the number of times of rewriting of each block (i.e., the number of programs/erase cycles) uniform.

GC is an operation for increasing the number of free blocks. The free block is indicative of a block including no valid data. In GC, the controller 4 copies valid data in several blocks where the valid data and invalid data exist together to the other block (for example, a free block). The valid data is indicative of data associated with a certain logical address. For example, data referred to by the L2P table 31 (i.e., data associated with the logical address as the latest data) is valid data and may be read later by the host 2. The invalid data is indicative of data which is not associated with any logical addresses. The data which is not associated with any logical addresses is data which may not be read any more by the host 2. Then, the controller 4 updates the L2P table 31 and maps the physical addresses of the copy destination of copied valid data to logical addresses of the copied valid data, respectively. A block which only includes invalid data after valid data have been copied to another block is released as a free block. This block can be thereby reused for data write after an erase operation of this block is executed.

The controller 4 may comprise a function of managing a plurality of namespaces used by the host 2 to access the SSD 3.

A plurality of namespaces are logical address ranges independent of each other and are used to operate one storage device such that the storage device can be used as a plurality of storage devices. The controller 4 may map a plurality of namespaces to the logical address space of the SSD 3. Each namespace includes a set of a plurality of contiguous logical addresses (LBA). A logical address range corresponding to each namespace starts from LBA0. The size of each namespace can be set freely.

The controller 4 includes a host interface 11, a CPU 12, a NAND interface 13, a DRAM interface 14, a direct memory access controller (DMAC) 15, a static RAM (SRAM) 16, an ECC encode/decode unit 17, and the like. The host interface 11, the CPU 12, the NAND interface 13, the DRAM interface 14, the DMAC 15, the SRAM 16, and the ECC encode/decode unit 17 are interconnected via the bus 10.

The host interface 11 is a host interface circuit configured to execute communication with the host 2. The host interface 11 may be, for example, a PCIe controller (NVMe controller). Alternatively, when the SSD 3 is configured to be connected to the host 2 via Ethernet (registered trademark), the host interface 11 may be an NVMe over Fabrics (NVMeOF) controller.

The host interface 11 receives various commands from the host 2. These commands include a write command (program command) and a read command.

The write command is a command (write request) to write data to be written (write command) to the NAND flash memory 5, and includes, for example, a namespace identifier (NSID) to identify the namespace, a logical address (starting LBA) associated with the write data, the data size of the write data, a data pointer (buffer address) indicative of a location in the memory (write buffer) of the host 2 where the write data is stored, and the like. The memory of the host 2 is also simply referred to as a host memory in the following descriptions.

The read command is a command (read request) to read data from the NAND flash memory 5. The read command includes, for example, a namespace identifier (NSID) to identify the namespace, a logical address (starting LBA) associated with data (read target data), the data size of the read target data, a data pointer (buffer address) indicative of a location in the host memory (read buffer) to which the read target data is to be transferred, and the like.

The write command and the read command are used as commands to access the NAND flash memory 5.

The CPU 12 is a processor configured to control the host interface 11, the NAND interface 13, the DRAM interface 14, the DMAC 15, the SRAM 16, and the ECC encode/decode unit 17. The CPU 12 loads a control program (firmware) from the NAND flash memory 5 or a ROM (not illustrated) into the DRAM 6 in response to power-on of the SSD 3, and executes various processes by executing the firmware. Incidentally, the firmware may be loaded on the SRAM 16.

The CPU 12 can execute command processes for processing various commands from the host 2, and the like. In the command process, the CPU 12 controls a write control operation of writing the data to the NAND flash memory 5 and a read control operation of reading the data from the NAND flash memory 5, based on each write command and each read command received from the host 2.

Furthermore, to execute the above GC, the CPU 12 executes a read control operation of reading the valid data from one or more copy source blocks as copy target data, and a write control operation of writing the copy target data to the copy destination block (free block). Moreover, the CPU 12 also controls execution of an erase operation for a block in the NAND flash memory 5 as needed.

The operations of the CPU 12 are controlled by the above-mentioned firmware. Incidentally, a part or all parts of the command processing may be executed by dedicated hardware in the controller 4.

Furthermore, the CPU 12 can function as a scheduler 21. Incidentally, a part or all parts of the scheduler 21 may also be implemented by dedicated hardware in the controller 4.

The scheduler 21 is configured to control access to the NAND flash memory 5, using a plurality of queues in which a plurality of commands to access the NAND flash memory 5 are stored. The plurality of queues may be implemented by a part of the storage region of the SRAM 16 or may be implemented by a part of the storage region of the DRAM 6.

Various commands to access the NAND flash memory 5 are stored in each of the plurality of queues. The access to the NAND flash memory 5 includes a write operation (program operation) of writing data to the NAND flash memory 5, a read operation of reading data from the NAND flash memory 5, and an erase operation of erasing the data already written to the NAND flash memory 5 in block units.

Therefore, the commands stored in each of the plurality of queues are roughly classified into an erase command, a program command, and a read command.

The erase command is used to execute the erase operation of erasing the data in block units. The program command is used to write the data received from the host 2 or the data to be copied for the GC to the NAND flash memory 5. The read command is used to read the read target data required by the host 2 or the data to be copied for the GC from the NAND flash memory 5.

Each of the plurality of queues is implemented as a first-in first-out buffer (FIFO buffer). The scheduler 21 executes a scheduling operation of determining the queue where the command is to be executed, using two types of parameters (first weights and second weights) corresponding to each of the plurality of queues. Executing the command is indicative of sending a command sequence to execute the operation corresponding to this command to the NAND flash memory 5 and causing the NAND flash memory 5 to execute the operation corresponding to this command.

The scheduler 21 manages a plurality of first weights corresponding to the plurality of queues, respectively, and a plurality of second weights corresponding to the plurality of queues, respectively. The plurality of second weights are used to determine a priority order of the plurality of queues.

Each of a plurality of first weights can be set freely, and is used as a parameter to control the frequency of executing commands stored in each of the queues.

For example, in a case of using a policy (policy #1) of selecting the queue having the largest second weight from the plurality of queues as the queue of the highest priority, every time execution of a command stored in one queue is started, the scheduler 21 updates the second weight corresponding to this queue by subtracting the first weight corresponding to this queue from the second weight corresponding to this queue. Therefore, the frequency of executing the commands stored in this queue is reduced as the first weight assigned to the queue is larger, and the frequency of executing the commands stored in this queue is increased as the first weight assigned to the queue is smaller.

In contrast, in a case of using a policy (policy #2) of selecting the queue having the smallest second weight from the plurality of queues as the queue of the highest priority, every time execution of a command stored in one queue is started, the scheduler 21 updates the second weight corresponding to this queue by adding the first weight corresponding to this queue to the second weight corresponding to this queue. Therefore, the frequency of executing the commands stored in this queue is reduced as the first weight assigned to the queue is larger, and the frequency of executing the commands stored in this queue is increased as the first weight assigned to the queue is smaller.

Thus, when the execution of the command stored in one of the plurality of queues is started, the second weight corresponding to this queue is updated to the value obtained by subtracting the first weight corresponding to this queue from the second weight corresponding to this queue or adding the first weight corresponding to this queue to the second weight corresponding to this queue.

The scheduler 21 selects a queue having the largest or smallest second weight, of the plurality of queues, as the queue of the highest priority. When the policy #1 is applied, the scheduler 21 selects the queue having the largest second weight, of the plurality of queues, as the queue of the highest priority. In contrast, when the policy #2 is applied, the scheduler 21 selects the queue having the smallest second weight, of the plurality of queues, as the queue of the highest priority.

The scheduler 21 starts execution of the command stored in the queue selected as the queue of the highest priority, and thereby executes writing data to the NAND flash memory 5, reading data from the NAND flash memory 5 or erasing data stored in the NAND flash memory 5.

More specifically, the scheduler 21 first fetches a next execution target command stored in the selected queue. The next execution target command is, for example, the oldest command that is the first stored command, of the commands stored in the selected queue.

When the fetched command is a program command, the scheduler 21 sends a command sequence for executing a program operation corresponding to the program command to the NAND flash memory 5 and thereby causes the NAND flash memory 5 to start the program operation. This command sequence includes, for example, a first program command, write data, an address, and a second program command.

When the fetched command is an erase command, the scheduler 21 sends a command sequence for executing the erase operation corresponding to the erase command to the NAND flash memory 5 and thereby causes the NAND flash memory 5 to start the erase operation to the block designated by the command sequence. This command sequence includes, for example, a first erase command, an address, and a second erase command.

When the fetched command is a read command, the scheduler 21 sends a command sequence for executing a read operation corresponding to this read command to the NAND flash memory 5 and thereby causes the NAND flash memory 5 to start the read operation. This command sequence includes, for example, a first read command, an address, and a second read command.

In addition, the scheduler 21 updates the second weight corresponding to the selected queue as the queue of the highest priority. The operation of updating the second weight is executed when execution of the command stored in the queue selected as the queue of the highest priority is started, for example, when the queue of the highest priority is determined.

When the policy #1 is applied, the scheduler 21 updates the second weight by subtracting the first weight corresponding to the selected queue from the second weight corresponding to the selected queue. When the policy #2 is applied, the scheduler 21 updates the second weight by adding the first weight corresponding to the selected queue to the second weight corresponding to the selected queue.

Thus, when a certain queue is selected as the queue of the highest priority, the second weight corresponding to this queue is reduced or increased by the first weight corresponding to this queue.

Therefore, when the first weight corresponding to a certain queue is set to a large value, and once this queue is selected as the queue of the highest priority, the second weight corresponding to this queue is significantly reduced (or significantly increased), and this queue is thereby hardly selected as the queue of the highest priority for a while. In contrast, when the first weight corresponding to a certain queue is set to a small value, and even when this queue is once selected as the queue of the highest priority, the second weight corresponding to this queue is not significantly reduced (or significantly increased), and this queue can easily be therefore selected again as the queue of the highest priority.

For example, in a case where the read commands to the NAND flash memory 5 are to be executed at a higher frequency than the program commands to the NAND flash memory 5, the controller 4 may store the first command group including a plurality of read commands in a certain queue (queue #1) and store the second command group including a plurality of program commands in the other queue (queue #2) and, furthermore, may set the first weight corresponding to the queue #1 to, for example, 1 and set the first weight corresponding to the queue #2 to, for example, 5.

For example, when the policy #1 is applied, the second weight corresponding to the queue #2 is reduced by 5 each time the execution of the program command of the queue #2 is started, and the second weight corresponding to the queue #1 is reduced by 1 each time the execution of the read command of the queue #1 is started. As a result, the first command group (read commands) stored in the queue #1 can be executed at a frequency five times as large as that of the second command group (program commands) stored in the queue #2.

Alternatively, in a case where the first command group including a plurality of commands from user application A is to be executed at a higher frequency than the second command group including a plurality of commands from user application B, the controller 4 may store the first command group in a certain queue (queue #1), store the second command group in the other queue (queue #2), set the first weight corresponding to the queue #1 to, for example, 1, and set the first weight corresponding to the queue #2 to, 2. As a result, the first command group stored in the queue #1 can be executed at a double frequency of the second command group stored in the queue #2.

The NAND interface 13 is a memory control circuit configured to control the NAND flash memory 5 under the control of the CPU 12.

The DRAM interface 14 is a DRAM control circuit configured to control the DRAM 6 under the control of the CPU 12. A part of the storage region of the DRAM 6 may be used as a storage region for storing the L2P table 31.

The DMAC 15 executes data transfer between the memory of the host 2 and the internal buffer 161 under control of the CPU 12. For example, the internal buffer 161 is used to temporarily store the write data received from the host 2. When the write data is to be transferred from the memory of the host 2 to the internal buffer 161, the CPU 12 specifies for the DMAC 15 a transfer source address indicative of a location in the memory of the host 2, the size of the data to be transferred, and a transfer destination address indicative of a location in the internal buffer 161.

When the data is to be written to the NAND flash memory 5, the ECC encode/decode unit 17 encodes the data (data to be written) (ECC encoding), thereby adding an error correction code (ECC) to the encoded data as a redundant code. When the data is read from the NAND flash memory 5, the ECC encode/decode unit 17 uses the ECC added to the read data to execute error correction of the data (ECC decoding).

Figure 4:
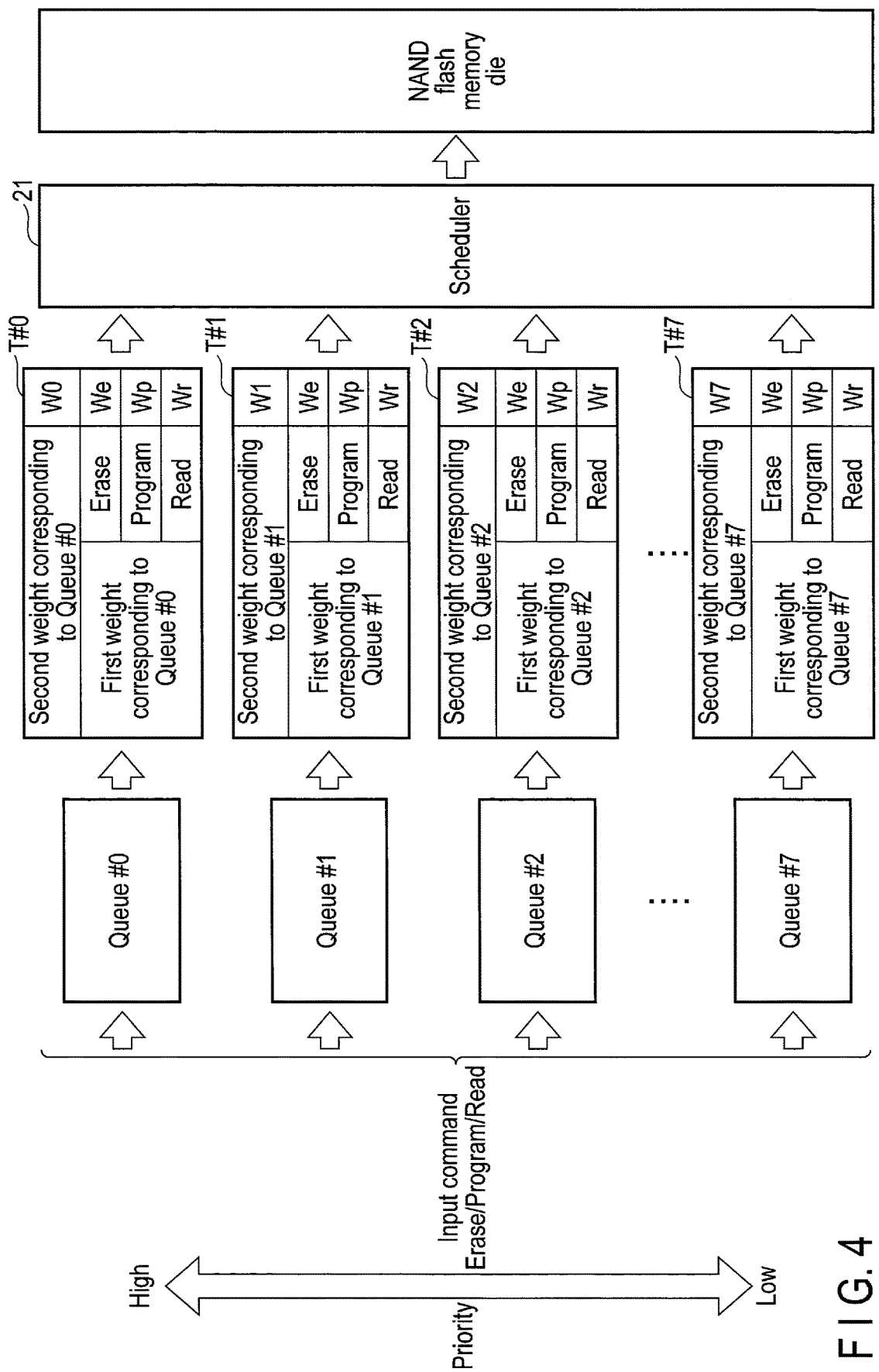
FIG. 4 is a block diagram illustrating a configuration example for executing a scheduling operation of selecting a queue of the highest priority from a plurality of queues, using two types of parameters (first weight and second weight) corresponding to each of a plurality of queues.

FIG. 4 is a block diagram illustrating a configuration example for executing a scheduling operation of selecting a queue of the highest priority from a plurality of queues, using two types of parameters (first weight and second weight) corresponding to each of a plurality of queues. The scheduling operation in a case of using the above policy #1 will be described below. However, the scheduling operation in a case of using the above policy #2 can also be executed similarly to the scheduling operation in the case of using the policy 31 described below.

For example, eight queues (queue #0, queue #1, queue #2, . . . , and queue #7) may be provided for each NAND flash memory die. Each of the commands (erase command, program command, and read command) to access a certain NAND flash memory die is stored in one of eight queues (queue #0, queue #1, queue #2, . . . , and queue #7) corresponding to this NAND flash memory die.

For example, when the controller 4 receives a certain write command from the host 2, the controller 4 determines the NAND flash memory die to which the write data associated with the received write command is to be written, and stores this write command in one of eight queues corresponding to the determined NAND flash memory die as the program command to access the determined NAND flash memory die. In this case, the controller 4 classifies this write command to one of eight command groups corresponding to eight queues, respectively, and stores the write command in the queue corresponding to the command group as a program command for the NAND flash memory die. A method of classifying the write commands is not limited and any methods can be used.

For example, each of namespace identifiers (NSID) of a plurality of namespaces may be associated with each of queue identifiers (queue ID) of eight queues (queue #0, queue #1, queue #2, . . . , and queue #7).

In this case, when the received write command designates NSID1 of the namespace #1, the controller 4 may store this write command in, for example, the queue #0 having queue ID #0 associated with the NSID1, as the program command to access this NAND flash memory die. When the received write command designates NSID2 of the namespace #2, the controller 4 may store this write command in, for example, the queue #1 having queue ID #1 associated with the NSID2, as the program command to access this NAND flash memory die.

When the controller 4 receives a certain read command from the host 2, the controller 4 determines the NAND flash memory die where read target data designated by the received read command is stored, by referring to the L2P table 31, and stores tis read command in one of eight queues corresponding to this NAND flash memory die.

For example, when the read command received from the host 2 designates the NSID1, the controller 4 may store this read command in, for example, the queue #0 having the queue ID #0 associated with the NSID1, of eight queues corresponding to the NAND flash memory die.

Alternatively, each of NSID may not be associated with each of queue ID, but each of submission queue identifiers (SQID) identifying a plurality of submission queues in the host memory may be associated with each of the above queue IDs.

In this case, for example, the write command acquired from submission queue #1 may be stored in, for example, queue #1 having queue ID #1 associated with SQID #1 of the submission queue #1, of eight queues (queue #0, queue #1, queue #2, . . . , and queue #7) corresponding to the NAND flash memory die where the write data is to be written.

In addition, for example, the read command acquired from submission queue #2 may be stored in, for example, queue #1 having queue ID #1 associated with SQID #2 of the submission queue #2, of eight queues (queue #0, queue #1, queue #2, . . . , and queue #7) corresponding to the NAND flash memory die where the read target data is stored.

Alternatively, one or more queues of eight queues corresponding to the respective NAND flash memory dies may be used as queues for reading where the read commands received from the host 2 are to be stored, and one or more other queues may be used as queues for writing where the write commands received from the host 2 are to be stored.

Thus, the scheduler 21 classifies each of the commands received from the host 2 to a command group of a plurality of command groups corresponding to the plurality of queues, and stores each of the received commands in the queue corresponding to this command group.

Incidentally, each of the commands received from the host 2 may be stored in the queue as it is or the controller 4 may generate a command for causing the NAND flash memory die to execute the operation corresponding to each of the commands received from the host 2 and may store the generated command in the queue.

In addition, in the present embodiment, a plurality of queues are prepared for each of the NAND flash memory dies such that a plurality of NAND flash memory dies can be accessed parallel. However, the plurality of queues may be used commonly by the plurality of NAND flash memory dies.

The scheduler 21 manages the first weight and the second weight for each queue, using weight management tables (T #0 to T #7) corresponding to the respective queues (#0 to #7).

For example, second weight W0 corresponding to the queue #0 is stored on the weight management table T #0 corresponding to the queue #0.

Furthermore, on the weight management table T #0 corresponding to the queue #0, weight We associated with the erase command, weight Wp associated with the program command, and weight Wr associated with the read command are stored as the first weight corresponding to the queue #0.

Each of the weight We, the weight Wp, and the weight Wr corresponds to the command type of the command acquired from the queue #0. For example, when a next execution target command stored in the queue #0 is the erase command, the weight We is used to update the second weight W0. Similarly, the weight Wp is used to update the second weight W0 when the next execution target command stored in the queue #0 is the program command, and the weight Wr is used to update the second weight W0 when the next execution target command stored in the queue #0 is the read command.

Similarly, second weight W1 corresponding to the queue #1 is stored on the weight management table T #1 corresponding to the queue #1. Furthermore, on the weight management table T #1 corresponding to the queue #1, weight We associated with the erase command, weight Wp associated with the program command, and weight Wr associated with the read command are stored as the first weight corresponding to the queue #1.

Each of the weight We, the weight Wp, and the weight Wr corresponds to the command type of the command acquired from the queue #1. For example, when a next execution target command stored in the queue #1 is the erase command, the weight We is used to update the second weight W1. Similarly, the weight Wp is used to update the second weight W1 when the next execution target command stored in the queue #1 is the program command, and the weight Wr is used to update the second weight W1 when the next execution target command stored in the queue #1 is the read command.

As regards each of the NAND flash memory dies, the scheduler 21 compares eight second weights W0 to W7 and selects the queue having the largest second weight as the queue of the highest priority. Then, the scheduler 21 fetches the next execution target command (oldest command) stored in the selected queue from the selected queue, and starts execution of the fetched command.

In this case, the scheduler 21 causes the NAND flash die to execute the operation (write operation, read operation, or erase operation) corresponding to the fetched command by sending a command sequence corresponding to the fetched command to the NAND flash die.

The weight We, weight Wp, and weight Wr corresponding to each queue can be set freely. For example, the host 2 may individually designate values of the weight We, weight Wp, and weight Wr for each of the plurality of queues.

An example of setting the weight We, weight Wp, and weight Wr corresponding to each queue will be described here.

For example, in a case of using the queue #0 as the queue for writing and using the queue #1 as the queue for reading, when the weight Wp of the queue #0 for writing is set to 10 and the weight Wr of the queue #1 for reading is set to 1, 10 are subtracted from W0 every time the program command of the queue #0 for writing is executed. In contrast, as regards W1, 1 is subtracted from W1 every time the read command of the queue 31 for reading is executed. Therefore, the read commands can be executed at a frequency ten times as large as the program commands.

In addition, in a case of using each of the queue #0 and the queue #1 to store the program command, the erase command, and the read command, when We, Wp, and Wr of the queue #0 are set to 10, 10, and 1 and We, Wp, and Wr of the queue #1 are set to 20, 20, and 2, the commands stored in the queue #1 can be executed at a frequency twice as large as the commands stored in the queue #2.

Incidentally, when the second weights corresponding to two or more queues are the same as each other and the second weights corresponding to the two or more queues are the largest (or the smallest in the case of the policy #2), the scheduler 21 selects the queue having a smaller queue identifier or a larger queue identifier, of the two or more queues, as the queue of the highest priority. FIG. 4 illustrates an example where a higher priority is assigned to a queue having a smaller queue identifier.

Figure 5:
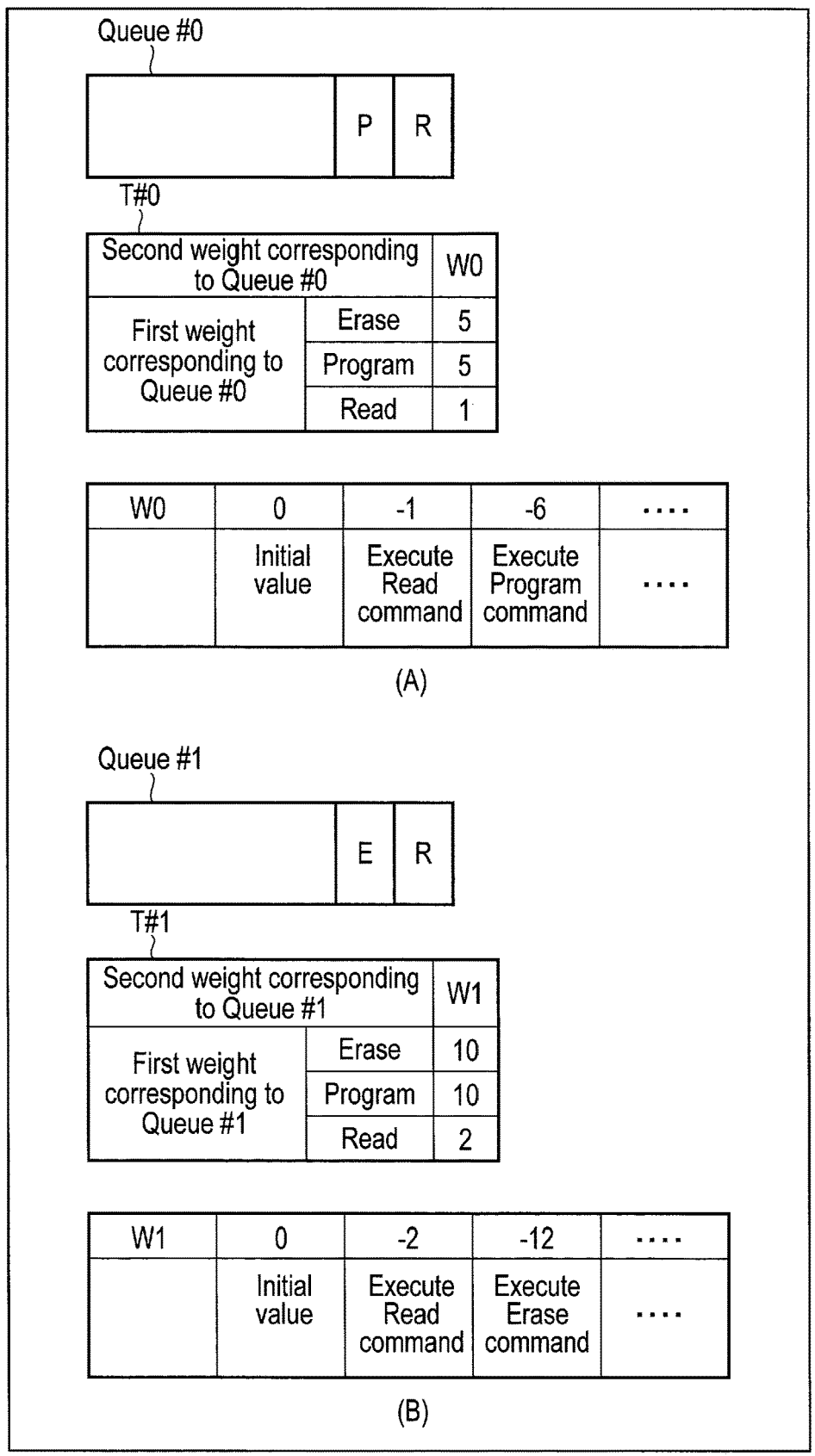
FIG. 5 is a diagram illustrating, in a case where execution of a command stored in one queue of the plurality of queues is started, an operation of updating the weight (second weight) corresponding to the one queue.

FIG. 5 is a diagram illustrating an operation of updating the weight (second weight) corresponding to one queue of the queues (#0 to #7) in a case where execution of the command stored in this queue is started.

As illustrated in (A) of FIG. 5, for example, a case where We, Wp, and Wr of the queue #0 are set to 10, 10, and 2 is assumed. First, the second weights W0 to W7 of the queues (#0 to #7) are set to an initial value (for example, 0).

When the queue #0 is selected as the queue of the highest priority, execution of the next execution target command stored in the queue #0 is started. When the next execution target command is the read command, the scheduler 21 acquires the weight Wr (=1) corresponding to the read command from the weight management table T #0, and updates the second weight W0 (=0) corresponding to the queue #0 to a value (=−1) obtained by subtracting 1 from the W0 (=0).

Then, when the queue #0 is selected again as the queue of the highest priority, execution of the next execution target command stored in the queue #0 is started. When the next execution target command is the program command, the scheduler 21 acquires the weight Wp (=5) corresponding to the program command from the weight management table T #0, and updates the second weight W0 (=−1) corresponding to the queue #0 to a value (=−6) obtained by subtracting 5 from the W0 (=−1).

As illustrated in (B) of FIG. 5, a case where We, Wp, and Wr of the queue #1 are set to 10, 10, and 2 is assumed.

When the queue #1 is selected as the queue of the highest priority, execution of the next execution target command stored in the queue #1 is started. When the next execution target command is the read command, the scheduler 21 acquires the weight Wr (=2) corresponding to the read command from the weight management table T #1, and updates the second weight W1 (=0) corresponding to the queue #1 to a value (=−2) obtained by subtracting 2 from the W1 (=0).

Then, when the queue #1 is selected again as the queue of the highest priority, execution of the next execution target command stored in the queue #1 is started. When the next execution target command is the erase command, the scheduler 21 acquires the weight We (=10) corresponding to the erase command from the weight management table T #1, and updates the second weight W0 (=−2) corresponding to the queue #1 to a value (=−12) obtained by subtracting 10 from the W0 (=−2).

Figure 6:
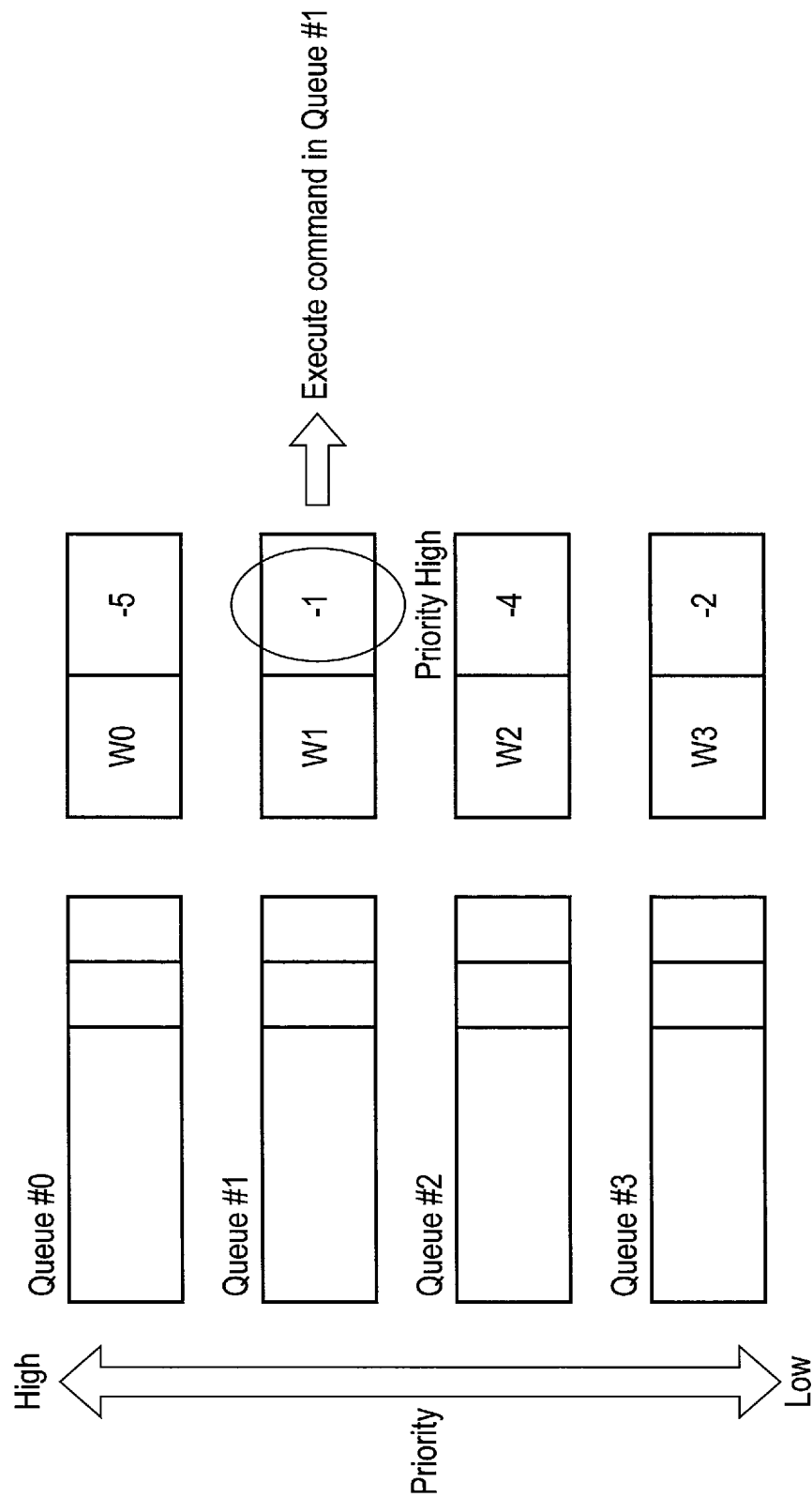
FIG. 6 is a diagram illustrating an operation of selecting the queue of the highest priority by comparing the second weights of the plurality of queues.

FIG. 6 is a diagram illustrating an operation of selecting the queue of the highest priority by comparing the second weights W0 to W7 corresponding to the queues (#0 to #7).

FIG. 6 illustrates an example where the commands are stored in the only queues #0 to #3. When the current values of W0, W1, W2, and W3 are −5, −1, −4, and −2, the scheduler 21 selects the queue #1 as the queue of the highest priority and executes the command in the queue #1.

FIG. 7 is a diagram illustrating an operation of selecting the queue of the highest priority from two or more queues of the same priority.

FIG. 7 illustrates an example where the commands are stored in the only queues #0 to #3. When the current values of W0, W1, W2, and W3 are −5, −1, 0, and 0, the scheduler 21 selects the queue #2 having a smaller queue identifier, of the queue #2 and the queue #3, as the queue of the highest priority and executes the command in the queue #2.

FIG. 8 is a table illustrating a weight recovery operation executed each time a certain time elapses or each time a command is executed.

In FIG. 8, an example where four queues #0 to #3 are provided is assumed.

Each time a certain time elapses or each time one command is executed, the scheduler 21 executes a weight recovery operation of making each of the second weights W0 to W3 closer to the initial value (for example, 0) by adding a preset first value to each of the second weights W0 to W3 of the queues #0 to #3.

For example, the current values of W0, W1, W2, and W3 are −10, −5, −3, and 0 at a certain time t. At time t+1, 1 is added to each of the current values of W0, W1, W2, and W3, and the current values of W0, W1, W2, and W3 become −9, −4, −2, and 0. When 0 are set as the upper limit of the second weight, the current value of W3 is maintained at 0.

At time t+2, 1 is added to each of the current values of W0, W1, W2, and W3, and the current values of W0, W1, W2, and W3 become −8, −3, −1, and 0. At time t+3, 1 is added to each of the current values of W0, W1, W2, and W3, and the current values of W0, W1, W2, and W3 become −7, −2, 0, and 0. At time t+4, 1 is added to each of the current values of W0, W1, W2, and W3, and the current values of W0, W1, W2, and W3 become −6, −1, 0, and 0.

Since unlimited increase of an absolute value of the second weight of each queue can suppressed by the weight recovery operation, and the variation range of the second weight of each queue can be made to fall within a practical range.

FIG. 9 is a table illustrating a weight consumption operation of updating (consuming) the second weight of the queue selected as the queue of the highest priority, and the weight recovery operation of recovering the second weight of each queue.

In FIG. 9, an example where four queues #0 to #3 are provided is assumed.

For example, the current values of W0, W1, W2, and W3 are −10, −5, −3, and 0 at a certain time t. Since the current value of W3 is the largest, the command in the queue #3 is executed.

When the first weight W corresponding to this command is 3 (W=3), 1 is added to each of W0, W1, W2, and W3, and 3 are subtracted from W1, at time t+1. As a result, the current values of W0, W1, W2, and W3 become −9, −4, −2, and −2. Since the current values of W2 and W3 are the largest, the command in the queue #2 having a smaller queue ID is next executed.

When the first weight W corresponding to this command is 6 (W=6), 1 is added to each of W0, W1, W2, and W3, and 6 are subtracted from W1, at time t+2. As a result, the current values of W0, W1, W2, and W3 become −8, −3, −7, and −1. Since the current value of W3 is the largest, the command in the queue #3 is next executed.

When the first weight W corresponding to this command is 3 (W=3), 1 is added to each of W0, W1, W2, and W3, and 3 are subtracted from W1, at time t+3. As a result, the current values of W0, W1, W2, and W3 become −7, −2, −6, and −3. Since the current value of W1 is the largest, the command in the queue #1 is next executed.

When the first weight W corresponding to this command is 7 (W=7), 1 is added to each of W0, W1, W2, and W3, and 7 are subtracted from W1, at time t+4. As a result, the current values of W0, W1, W2, and W3 become −6, −8, −5, and −2.

Figures 10, 11:
FIG. 10 is a table illustrating another weight recovery operation of distributing the first weight of the queue selected as the queue of the highest priority to the second weight corresponding to each of the other queues each time a command is executed.
FIG. 11 is a table illustrating an operation of suspending execution of a preceding program command and executing a read command.

FIG. 10 is a table illustrating another weight recovery operation of distributing the first weight of the queue selected as the queue of the highest priority to the second weight corresponding to each of the other queues.

The scheduler 21 executes the weight recovery operation of, every time executing one command, equally distributing the value of the first weight corresponding to the queue where the executed command is stored to the second weights corresponding to the queues other than this queue, and thereby making each of the second weights corresponding to the respective other queues closer to the initial value (for example, 0).

In FIG. 10, an example where four queues #0 to #3 are provided is assumed.

As a result, the current values of W0, W1, W2, and W3 become −9, −5, −3, and 0. Since the current value of W3 is the largest, the command in the queue #3 is executed.

When the first weight W corresponding to this command is 3 (W=3), 3 are subtracted from W3, and 3 are equally distributed to W0, W1, and W2, at time t+1. As a result, the current values of W0, W1, W2, and W3 become −8, −4, −2, and −3. Since the current value of W2 is the largest, the command in the queue #2 is next executed.

When the first weight W corresponding to this command is 6 (W=6), 6 are subtracted from W2, and 6 are equally distributed to W0, W1, and W3, at time t+2. As a result, the current values of W0, W1, W2, and W3 become −6, −2, −8, and −1.

FIG. 11 is a table illustrating an operation of suspending execution of a preceding program command (or a preceding erase command) and executing the read command.

When a certain queue satisfies conditions (suspend conditions) that the read command is stored as the next execution target command and has the largest second weight (in the case of policy #2, the smallest second weight) of the plurality of queues, and when the command being executed in the NAND flash memory die corresponding to this queue is the erase command or the program command, the scheduler 21 executes this read command with a higher priority than the preceding erase command or the program command.

That is, the scheduler 21 suspends execution of the erase command or the program command by sending a suspend command to the NAND flash memory die. The suspend command is a command to cause the NAND flash memory die to temporarily suspend the operations (in this example, the erase operation and the program operation) which are being executed, to set the NAND flash memory die to be capable of accepting and executing the other command.

In FIG. 11, an example where three queues #0 to #2 are provided is assumed.

For example, at time t, the program operation corresponding to the program command stored in the queue #0 is being executed in the NAND flash memory die. A weight corresponding to the program command is already subtracted from the value of W0, and the current values of W0, W1, and W2 are −5, −6, and −4. The next execution target command stored in the queue #1 is the read command, and the next execution target command stored in the queue #2 is also the read command.

Since the next execution target command of the queue #2 is the read command and the second weight W2 of the queue #2 is the largest, the queue #2 satisfies the suspend conditions. In this case, the scheduler 21 suspends execution of the program command by sending the suspend command to the NAND flash memory die and, instead, fetches the next execution target command (read command) from the queue #2 and executes this read command.

When the first weight W corresponding to this read command is 3 (W=3), 1 is added to each of W0, W1, and W2, and 3 are subtracted from W2, at time t+1. As a result, the current values of W0, W1, and W2 are −4, −5, and −6.

In general, the time required to execute each of the program operation and the erase operation is longer than the time required to execute the read operation. Therefore, delay of the start of execution of the read command resulting from the preceding program command (or the erase command) can be prevented by suspending the program command (or the erase command) which is being executed and executing the read command in the queue satisfying the suspend conditions with higher priority than the program command (or the erase command) which is being executed.

FIG. 12 is a table illustrating an operation of continuing the execution of the preceding program command.

In FIG. 12, an example where three queues #0 to #2 are provided is assumed.

For example, at time t, the program operation corresponding to the program command stored in the queue #0 is being executed in the NAND flash memory die. A weight corresponding to the program command is already subtracted from the value of W0, and the current values of W0, W1, and W2 are −5, −6, and −7. The next execution target command stored in the queue #1 is the read command, and the next execution target command stored in the queue #2 is also the read command.

However, the second weight W1 of the queue #1 is smaller than W0, and the second weight W2 of the queue #2 is smaller than W0 and W1. Therefore, no queues satisfy the suspend conditions. In this case, the scheduler 21 continues execution of the preceding program command.

At time t+1, 1 is added to each of W0, W1, and W2, and the current values of W0, W1, and W2 become −4, −5, and −6.

FIG. 13 is a table illustrating an operation of restarting execution of the program command after suspending the execution of the program command.

In FIG. 13, an example where three queues #0 to #2 are provided is assumed.

For example, at time t, the program operation corresponding to the program command stored in the queue #0 is being executed in the NAND flash memory die. A weight corresponding to the program command is already subtracted from the value of W0, and the current values of W0, W1, and W2 are −5, −4, and −4. The next execution target command stored in the queue #1 is the read command, and the next execution target command stored in the queue #2 is also the read command.

The queues #2 and #3 satisfy the suspend conditions. In this case, the scheduler 21 suspends execution of the program command by sending the suspend command to the NAND flash memory die and, instead, fetches the next execution target command (read command) from the queue #1 having a smaller queue ID and starts executing this read command.

When the first weight W corresponding to this read command is 3 (W=3), 1 is added to each of W0, W1, and W2, and 3 are subtracted from W1, at time t+1. As a result, the current values of W0, W1, and W2 are −4, −6, and −3. At time t+1, the queue #2 satisfies the suspend conditions.

For this reason, after completing the execution of the read command stored in the queue #1, the scheduler 21 fetches the next execution target command (read command) from the queue #2 and starts execution of the read command.

When the first weight W corresponding to this read command is 3 (W=3), 1 is added to each of W0, W1, and W2, and 3 are subtracted from W2, at time t+2. As a result, the current values of W0, W1, and W2 are −3, −5, and −5.

Since no queues satisfy the suspend conditions, after completing the execution of the read command stored in the queue #1, the scheduler 21 sends a command to restart the execution of the command which is being suspended, to the NAND flash memory die, and thereby restarts the execution of the program command which is being suspended.

Then, at time t+2, 1 is added to each of W0, W1, and W2, and the current values of W0, W1, and W2 become −2, −4, and −4.

In the present embodiment, the following various scheduling operations can be executed in accordance with setting of the first weight corresponding to each of eight queues (queue #0, queue #1, queue #2, and queue #7).

(1) In a case where all the first weights of eight queues are set to 0, even if a command of any queue is executed, W0 to W7 are not varied and maintained at the initial values. Therefore, the scheduler 21 can cause eight queues to function as 8-level priority queuing.

In this case, first, the queue #0 having the smallest queue ID is selected as the queue of the highest priority. Each of the commands stored in the queue #0 is executed. When all the commands stored in the queue #0 are executed, the queue #1 having the next smallest queue ID is selected as the queue of the highest priority, and each command stored in the queue #1 is executed. When all the commands stored in the queue #1 are executed, the queue #2 having the next smallest queue ID is selected as the queue of the highest priority.

(2) In a case where all the first weights of eight queues are set to the same value, the scheduler 21 can cause eight queues to function as Round Robin Queuing.

In this case, first, the queue #0 having the smallest queue ID is selected as the queue of the highest priority, and one command stored in the queue #0 is executed. W0 is reduced. The queue #1 having the smallest queue ID, of the remaining queues #1 to #7, is selected as the queue of the highest priority. When one command stored in the queue #1 is executed, W1 is also reduced. Then, the queue #2 having the smallest queue ID, of the remaining queues #2 to #7, is selected as the queue of the highest priority.

(3) In a case where first weights different from each other are set in eight queues, the scheduler 21 can distribute the time to access the NAND flash memory 5 to eight command groups stored in the respective eight queues, based on the first weights, and can operate the eight queues as described with reference to FIG. 5 to FIG. 13.

Figure 14:
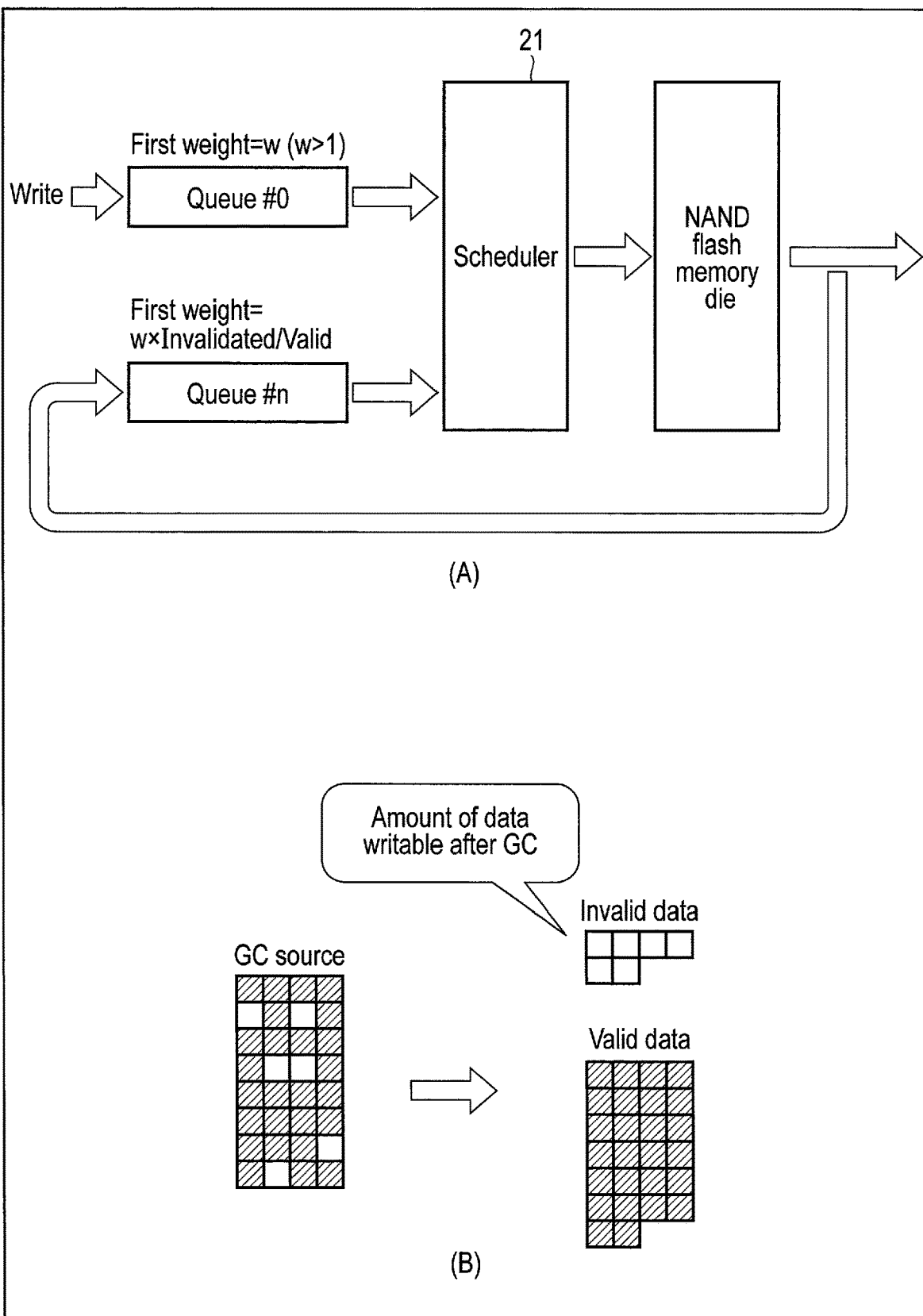
FIG. 14 is a diagram illustrating an operation of setting the first weight to be assigned to the first queue used to write the data from the host and the second weight to be assigned to the second queue used to write the data to be copied for garbage collection.

FIG. 14 is a diagram illustrating an operation of setting the first weight to be assigned to the queue used to write the data from the host 2 and the first weight to be assigned to the second queue used to write the data to be copied for garbage collection.

As illustrated in (A) of FIG. 14, the controller 4 allocates a queue (queue #0) used to write the data from the host 2 to the NAND flash memory die, and a queue (queue #n) used to write the data to be copied for garbage collection of the NAND flash memory 5 to this NAND flash memory die, as queues where the commands for the NAND flash memory die are to be stored.

In the SSD 3, the amount of the data written to the NAND flash memory 5 is a sum of the amount of the data written by the host 2 and the amount of the data written by garbage collection. For this reason, in general, the write amplification of the SSD 3 becomes the value larger than 1. The write amplification (WA) is defined as follows:

$$WA=\text{"total amount of data written to SSD"}/\text{"total amount of data written from host to SSD"}$$

The "total amount of data written to SSD" corresponds to the sum of the total amount of data written from the host to the SSD and the total amount of data internally written to the SSD by the garbage collection.

For example, when the write amplification is 3, the ratio of the amount of the data written by the host 2 and the amount of the data written by garbage collection is 1:2. In this case, when the writing by garbage collection can be executed at a double rate of the writing by the host 2, latency of writing by the host 2 can be made stable.

The write amplification is determined in accordance with the ratio of the valid data and the invalid data included in the copy source block for garbage collection.

For this reason, the controller 4 obtains the ratio of the valid data and the invalid data stored in one or more copy source blocks (GC sources) selected from a plurality of blocks of the nonvolatile memory. In (B) of FIG. 14, the valid data stored in the GC source are represented by hatching while the invalid data stored in the GC source are represented by blanks.

Then, the controller 4 sets the first weight to be assigned to the queue #0 used to write the data from the host 2 to the NAND flash memory die, and the first weight to be assigned to the queue #n used to write the data to be copied for garbage collection to this NAND flash memory die, based on the obtained ratio.

More specifically, the controller 4 sets the first weight corresponding to the queue #0 and the first weight corresponding to the queue #n, based on the ratio of the valid data and the invalid data, such that the ratio of the first weight corresponding to the queue #0 and the first weight corresponding to the queue #n matches the ratio of the valid data and the invalid data which are included in one or more copy source blocks.

In other words, the controller 4 sets the first weight corresponding to the queue #0 to the value proportional to the amount of the valid data and sets the first weight corresponding to the queue #n to the value proportional to the amount of the invalid data. When the first weight corresponding to the queue #0 is w (>1), the first weight corresponding to the queue #n may be set by a value represented by the following expression:

$$w \times \text{Invalidated/Valid}$$

Invalidated/Valid is indicative of a ratio of the invalid data to the valid data.

For example, when the ratio of the valid data and the invalid data stored in one or more copy source blocks is 2 (valid data):1 (invalid data), the first weight corresponding to the queue #0 and the first weight corresponding to the queue #n may be set such that the ratio of the first weight corresponding to the queue #0 and the first weight corresponding to the queue #n is 2:1. Thus, the program commands stored in the queue #n can be executed at a double frequency of the program commands stored in the queue #0.

When the weight of the program command, the weight of the erase command, and the weight of the read command are managed as the first weight corresponding to the queue #0 and, furthermore, the weight of the program command, the weight of the erase command, and the weight of the read command are managed as the first weight corresponding to the queue #n, the controller 4 may set each of the weight of the program command corresponding to the queue #0 and the weight of the program command corresponding to the queue #n such that the ratio of the weight of the program command corresponding to the queue #0 and the program command corresponding to the queue #n matches the ratio of the valid data and the invalid data which are included in one or more copy source blocks.

The controller 4 may allocate a pair of the queue #0 and the queue #n, i.e., a pair of the queue for host writing and the queue for writing for garbage collection, for each namespace.

In this case, the controller 4 may obtain the ratio of the valid data and the invalid data which are included in one or more copy source blocks for each namespace and set the first weights corresponding to respective two queues corresponding to each namespace, based on this ratio.

Thus, by controlling the first weight corresponding to the queue #0 and the first weight corresponding to the queue #n, in the present embodiment, the controller 4 can suppress the write latency variation resulting from the write amplification variation caused by the workload variation, by raising the ratio of the data amount written by the host 2 to the data amount written by GC when the write amplification is low, and by lowering this ratio when the write amplification is high. When the number of the copy source blocks used to calculate the ratio of the valid data and the invalid data is reduced, the ability to track to the workload variation can be enhanced. In addition, when the number of the copy source blocks used to calculate the ratio of the valid data and the invalid data is increased, performance variation can be reduced.

FIG. 15 is a flowchart illustrating a procedure of the scheduling operation executed in the SSD 3.

The controller 4 determines the priorities of the queues #0 to #7 based on the second weights W0 to W7 corresponding to the queues #0 to #7 described with reference to FIG. 4, and selects the queue of the highest priority from the queues #0 to #7 (step S101). In step S101, the controller 4 acquires the second weights W0 to W7 from the weight management tables T #0 to T #7 corresponding to the queues #0 to #7, compares the second weights W0 to W7, and thereby selects the queue having the largest second weight as the queue of the highest priority.

The controller 4 fetches the next execution target command stored in the selected queue from the selected queue, and starts execution of the fetched command (step S102).

The controller 4 acquires the first weight assigned to the selected queue from the weight management table corresponding to the selected queue (step S103). The controller 4 updates the second weight of the selected queue by subtracting the first weight of the selected queue from the second weight of the selected queue (step S104). When the weight We associated with the erase command, the weight Wp associated with the program command, and the weight Wr associated with the read command are managed as the first weight of the selected queue, the controller 4 selects the weight corresponding to the command type of the command which starts being executed (i.e., the command fetched from the selected queue), and updates the second weight of the selected queue by using the selected weight as the first weight.

Then, the controller 4 executes the weight recovery operation of increasing the second weight corresponding to each queue and making the second weight closer to the initial value (for example, 0) (step S105).

Figure 16:
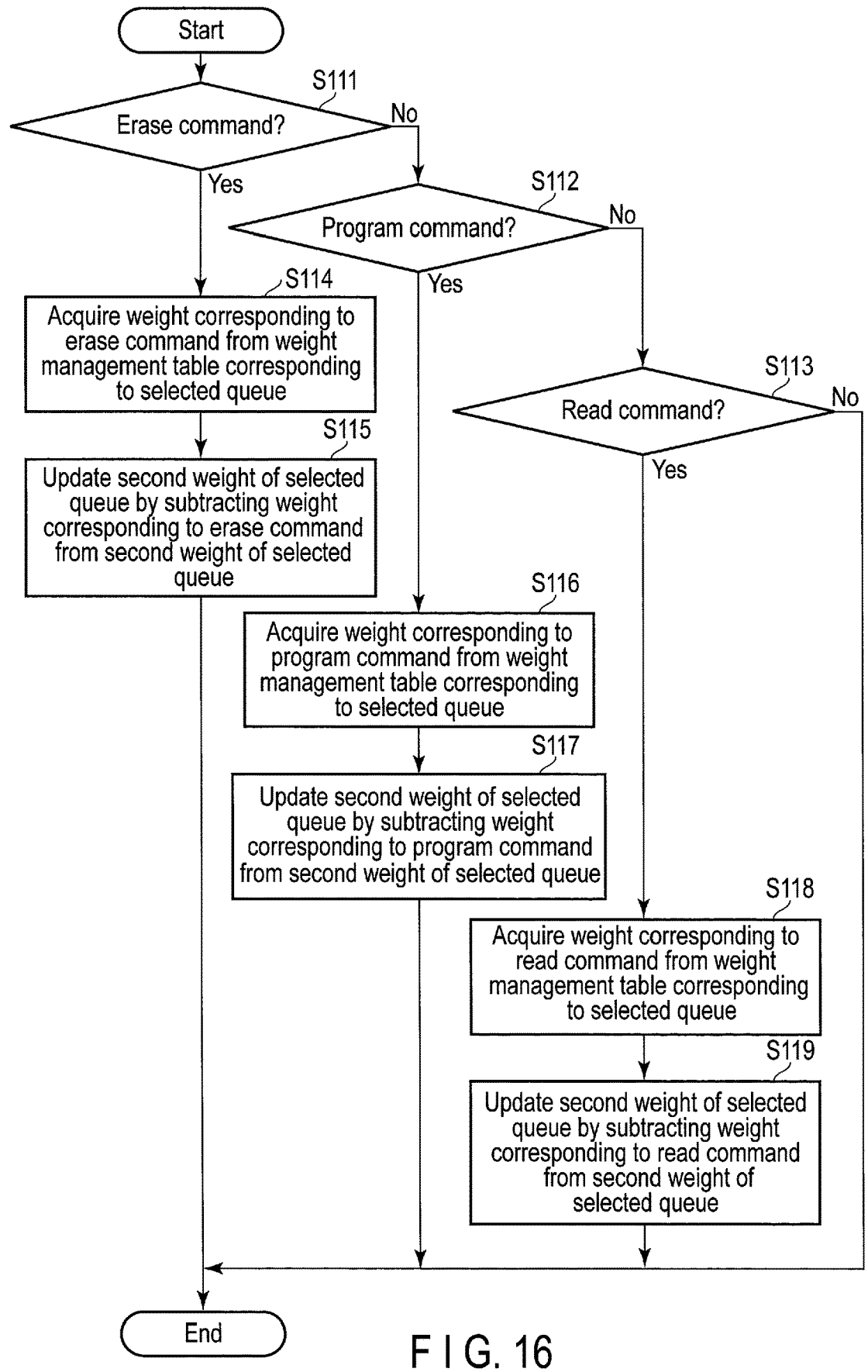
FIG. 16 is a flowchart illustrating a procedure of the operation of updating the second weight, using the weights which are associated with the erase command, the program command, and the read command, respectively.

FIG. 16 is a flowchart illustrating a procedure of the operation of updating the second weight, using the weights which are associated with the erase command, the program command, and the read command, respectively.

The controller 4 determines whether the command stored in the queue selected as the queue of the highest priority is the erase command, the program command, or the read command (steps S111, S112, and S113).

When the command stored in the selected queue is the erase command (YES in step S111), the controller 4 acquires the weight corresponding to the erase command from the weight management table corresponding to the selected queue (step S114). Then, the controller 4 updates the second weight corresponding to the selected queue by subtracting the weight corresponding to the erase command from the second weight corresponding to the selected queue (step S115).

When the command stored in the selected queue is the program command (YES in step S112), the controller 4 acquires the weight corresponding to the program command from the weight management table corresponding to the selected queue (step S116). Then, the controller 4 updates the second weight corresponding to the selected queue by subtracting the weight corresponding to the program command from the second weight corresponding to the selected queue (step S117).

When the command stored in the selected queue is the read command (YES in step S113), the controller 4 acquires the weight corresponding to the read command from the weight management table corresponding to the selected queue (step S118). Then, the controller 4 updates the second weight corresponding to the selected queue by subtracting the weight corresponding to the read command from the second weight corresponding to the selected queue (step S119).

Figure 17:
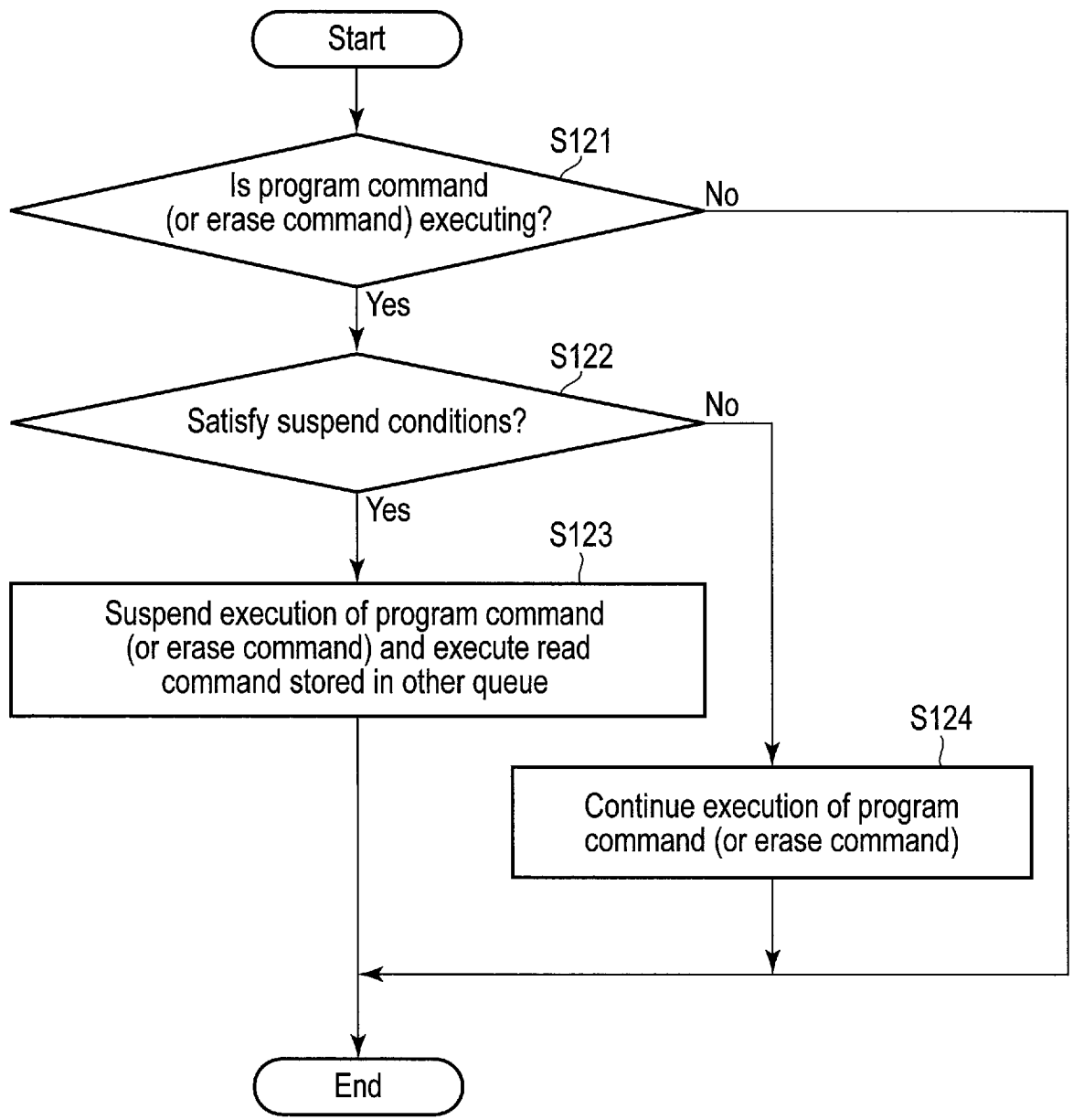
FIG. 17 is a flowchart illustrating a procedure of a suspend operation executed in the memory system according to the embodiment.

FIG. 17 is a flowchart illustrating a procedure of the suspend operation executed in the SSD 3.

The controller 4 determines whether or not the program command (or the erase command) is being executed (step S121). In step S121, when the preceding command fetched from the selected queue is the program command (or the erase command), it may be determined that the program command (or the erase command) is being executed.

When the program command (or the erase command) is being executed (YES in step S121), the controller 4 determines whether or not the queue satisfying the suspend conditions exists (step S122). The queue satisfying the suspend conditions is a queue where the read command is stored as the next execution target command and which has the largest second weight (in the case of the policy #2, the smallest second weight) of the plurality of queues.

When the queue satisfying the suspend conditions exists (YES in step S122), the controller 4 suspends execution of the program command (or the erase command) and starts execution of the next execution target command stored in the queue satisfying the suspend conditions (step S123).

When the queue satisfying the suspend conditions does not exist (NO in step S122), the controller 4 does not suspend execution of the program command (or the erase command) and continues execution of the program command (or the erase command) (step S124).

FIG. 18 is a diagram illustrating a procedure of an operation of setting the first weight to be assigned to the first queue used to write the data from the host 2 and the second weight to be assigned to the second queue used to write the data to be copied for garbage collection.

The controller 4 selects one or more copy source blocks for GC, from a plurality of blocks where the valid data and invalid data exist together (step S131). The controller 4 obtains the ratio (proportion) of the valid data and the invalid data which are stored in selected one or more copy source blocks (step S132).

Then, the controller 4 sets each of the first weight corresponding to the first queue and the first weight corresponding to the second queue, based on the ratio of the valid data and the invalid data included in one or more copy source blocks, such that the ratio of the first weight corresponding to the first queue used to write the data from the host 2 and the first weight corresponding to the second queue used to write the data to be copied for garbage collection matches the ratio of the valid data and the invalid data included in one or more copy source blocks (step S133).

In step S132, the controller 4 may obtain the amount of the valid data and the amount of the invalid data, which are included in one or more copy source blocks. In step S133, the controller 4 may assign a value proportional to the obtained amount of the valid data as the first weight corresponding to the first queue and assign a value proportional to the obtained amount of the invalid data as the first weight corresponding to the second queue.

As described above, according to the present embodiment, a plurality of queues where a plurality of commands to access the NAND flash memory 5 are stored are managed. When a certain queue is selected as the queue of the highest priority, the second weight corresponding to this queue is reduced by the first weight corresponding to this queue. Therefore, when the first weight corresponding to a certain queue is set to a large value, and once this queue is selected as the queue of the highest priority, the second weight corresponding to this queue is significantly reduced (or significantly increased), and this queue is thereby hardly selected as the queue of the highest priority. In contrast, when the first weight corresponding to a certain queue is set to a small value, and even when this queue is once selected as the queue of the highest priority, the second weight corresponding to this queue is not significantly reduced (or significantly increased), and this queue can easily be therefore selected again as the queue of the highest priority.

Thus, based on these first weights, the time to access the NAND flash memory 5 can be distributed to a plurality of command groups stored in the respective plurality of queues, and the access to the NAND flash memory 5 can flexibly be controlled.

In addition, by using the weight associated with the program command, the weight associated with the erase command, and the weight associated with the read command as the first weight, the value of the first weight subtracted from the second weight can adaptively be varied in accordance with the type of the executed command.

Therefore, for example, by increasing the weight of the erase command (or the program command) to execute the erase operation (or the program operation) which requires comparatively much time and by reducing the weight of the read command to execute the read operation of short required time, the time to access the NAND flash memory 5 can be distributed to the plurality of command groups that are stored in the plurality of queues, respectively, in consideration of the time required to execute the command.

In addition, the first weight to be assigned to the queue used to write the data from the host 2 and the first weight to be assigned to the second queue used to write the data to be copied for garbage collection are set based on the ratio of the valid data and the invalid data stored in one or more copy source blocks. Thus, the frequency at which the program commands used to write the data from the host 2 are executed and the frequency at which the program commands used for GC are executed can be appropriately adjusted by using the scheduling system, and the write latency variation resulting from the write amplification variation can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory; and
a controller electrically connected to the nonvolatile memory and configured to control the nonvolatile memory, wherein
the controller is configured to:
manage a plurality of queues where a plurality of commands to access the nonvolatile memory are stored;
manage a plurality of first weights that correspond to a plurality types of commands, for each of the plurality of queues, and a plurality of second weights that correspond to the plurality of queues, respectively, the second weight corresponding to a queue of the plurality of queues being updated to a value obtained by subtracting the first weight of the queue that corresponds to a type of a command stored in the queue from the second weight corresponding to the queue or by adding the first weight of the queue that corresponds to the type of the command stored in the queue to the second weight corresponding to the queue, when execution of the command stored in the queue is started;
select a queue of a largest or smallest second weight, of the plurality of queues, as a queue of a highest priority;
start execution of a command stored in the selected queue;
select a first weight from the plurality of first weights of the selected queue, based on a type of the command stored in the selected queue; and
update the second weight corresponding to the selected queue by subtracting the selected first weight of the selected queue from the second weight corresponding to the selected queue or by adding the selected first weight of the selected queue to the second weight corresponding to the selected queue.

2. The memory system of claim 1, wherein
the controller is configured to:
manage a weight associated with an erase command, a weight associated with a program command, and a weight associated with a read command, as the plurality of first weights, for each of the plurality of queues; and
select the weight associated with the erase command of the selected queue, the weight associated with the program command of the selected queue, or the weight associated with the read command of the selected queue, as the first weight of the selected queue, based on a type of the command stored in the selected queue, and update the second weight corresponding to the selected queue by subtracting the selected weight from the second weight corresponding to the selected queue or adding the selected weight to the second weight corresponding to the selected queue.

3. The memory system of claim 1, wherein
the controller is configured to:
when a queue satisfying conditions that a read command is stored as a next execution target command and has the largest or smallest second weight, of the plurality of queues, exists and when a command being executed in the nonvolatile memory is the erase command or the program command,
suspend execution of the erase command or the program command by sending a suspend command to the nonvolatile memory; and
start execution of the read command stored in the queue satisfying the conditions.

4. The memory system of claim 3, wherein
the controller is configured to:
when after completion of the execution of the read command stored in the queue satisfying the conditions, other queue satisfying the conditions exists, start execution of a read command stored in the other queue; and
when other queue satisfying the conditions does not exist, restart the execution of the erase command or the program command which is being suspended.

5. The memory system of claim 1, wherein
the plurality of queues include a first queue used to write data from a host to the nonvolatile memory and a second queue used to write data to be copied for garbage collection of the nonvolatile memory to the nonvolatile memory,
the plurality of first weights of the first queue include a first weight corresponding to a program command, and the plurality of first weights of the second queue include a first weight corresponding to a program command, and the controller is configured to:

obtain a ratio of valid data and invalid data which are stored in one or more copy source blocks selected from a plurality of blocks of the nonvolatile memory; and set each of the first weight corresponding to the program command of the first queue and the first weight corresponding to the program command of the second queue, based on the ratio of the valid data and the invalid data.

6. The memory system of claim 2, wherein the plurality of queues include a first queue used to write data from a host to the nonvolatile memory and a second queue used to write valid data to be copied for garbage collection of the nonvolatile memory to the nonvolatile memory, and the controller is configured to:

obtain a ratio of valid data and invalid data which are stored in one or more copy source blocks selected from a plurality of blocks of the nonvolatile memory; and set each of the weight associated with the program command of the first queue and the weight associated with the program command of the second queue, based on the ratio of the valid data and the invalid data.

7. The memory system of claim 1, wherein the controller is configured to:

each time a first time elapses or each time one command is executed, execute an operation of making each of the plurality of second weights close to an initial value of each of the second weights by adding a first value to each of the plurality of second weights or by subtracting the first value from each of the plurality of second weights.

8. The memory system of claim 1, wherein the controller is configured to:

each time one command is executed, make each of the second weights corresponding to the respective queues other than a first queue close to an initial value of each of the second weights by distributing the first weight of the first queue that corresponds to a type of the executed command, to the second weights corresponding to the respective queues other than the first queue, the first queue being a queue in which the executed command is stored.

9. The memory system of claim 1, wherein the controller is configured to:

when the second weights corresponding to two or more queues are the same as each other and when the second weights corresponding to the two or more queues are the largest or the smallest, select a queue having a smaller queue identifier or a larger queue identifier, of the two or more queues, as the queue of the highest priority.

10. A memory system comprising:

a nonvolatile memory; and a controller electrically connected to the nonvolatile memory and configured to control the nonvolatile memory, wherein the controller is configured to:

manage a weight associated with an erase command, a weight associated with a program command, and a weight associated with a read command, as a first weight, for each of a plurality of queues each storing a plurality of commands to access the nonvolatile memory, and manage a second weight to determine a priority order of the plurality of queues, for each of the plurality of queues, the second weight corresponding to a queue of the plurality of queues being updated to a value obtained by subtracting the first weight corresponding to the queue from the second weight corresponding to the queue or by adding the first weight corresponding to the queue to the second weight corresponding to the queue, when execution of a command stored in the queue is started;

select a queue of a largest or smallest second weight, of the plurality of queues, as a queue of a highest priority;

start execution of a command stored in the selected queue; and select the weight associated with the erase command of the selected queue, the weight associated with the program command of the selected queue, or the weight associated with the read command of the selected queue, as the first weight, based on a type of the command stored in the selected queue, and update the second weight corresponding to the selected queue by subtracting the selected weight from the second weight corresponding to the selected queue or adding the selected weight to the second weight corresponding to the selected queue.

11. The memory system of claim 10, wherein the controller is configured to:

when a queue satisfying conditions that a read command is stored as a next execution target command and has the largest or smallest second weight, of the plurality of queues, exists and when a command being executed in the nonvolatile memory is the erase command or the program command, suspend execution of the erase command or the program command by sending a suspend command to the nonvolatile memory; and start execution of the read command stored in the queue satisfying the conditions.

12. The memory system of claim 11, wherein the controller is configured to:

when after completion of the execution of the read command stored in the queue satisfying the conditions, other queue satisfying the conditions exists, start execution of a read command stored in the other queue; and when other queue satisfying the conditions does not exist, restart the execution of the erase command or the program command which is being suspended.

13. The memory system of claim 10, wherein the plurality of queues include a first queue used to write data from a host to the nonvolatile memory and a second queue used to write valid data to be copied for garbage collection of the nonvolatile memory to the nonvolatile memory, and the controller is configured to:

obtain a ratio of valid data and invalid data which are stored in one or more copy source blocks selected from a plurality of blocks of the nonvolatile memory; and set each of the weight associated with the program command of the first queue and the weight associated with the program command of the second queue, based on the ratio of the valid data and the invalid data.

14. A method of controlling a nonvolatile memory, the method comprising:

managing a plurality of queues where a plurality of commands to access the nonvolatile memory are stored;

managing a plurality of first weights that correspond to a plurality types of commands, for each of the plurality of queues, and a plurality of second weights that correspond to the plurality of queues, respectively, the second weight corresponding to a queue of the plurality of queues being updated to a value obtained by subtracting the first weight of the queue that corresponds to a type of a command stored in the queue from the second weight corresponding to the queue or by adding the first weight of the queue that corresponds to the type of the command stored in the queue to the second weight corresponding to the queue, when execution of the command a stored in the queue is started;

selecting a queue of a largest or smallest second weight, of the plurality of queues, as a queue of a highest priority;

starting execution of a command stored in the selected queue;

selecting a first weight from the plurality of first weights of the selected queue, based on a type of the command stored in the selected queue; and updating the second weight corresponding to the selected queue by subtracting the selected first weight of the selected queue from the second weight corresponding to the selected queue or by adding the selected first weight of the selected queue to the second weight corresponding to the selected queue.

15. The method of claim 14, further comprising:

managing a weight associated with an erase command, a weight associated with a program command, and a weight associated with a read command, as the plurality of first weights, for each of the plurality of queues, wherein the updating includes selecting the weight associated with the erase command of the selected queue, the weight associated with the program command of the selected queue, or the weight associated with the read command of the selected queue, as the first weight of the selected queue, based on a type of the command stored in the selected queue, and updating the second weight corresponding to the selected queue by subtracting the selected weight from the second weight corresponding to the selected queue or adding the selected weight to the second weight corresponding to the selected queue.

16. The method of claim 14, further comprising:

when a queue satisfying conditions that a read command is stored as a next execution target command and has the largest or smallest second weight, of the plurality of queues, exists and when a command being executed in the nonvolatile memory is the erase command or the program command, suspending execution of the erase command or the program command by sending a suspend command to the nonvolatile memory; and starting execution of the read command stored in the queue satisfying the conditions.

17. The method of claim 16, further comprising:

when after completion of the execution of the read command stored in the queue satisfying the conditions, other queue satisfying the conditions exists, starting execution of a read command stored in the other queue, and when other queue satisfying the conditions does not exist, restarting the execution of the erase command or the program command which is being suspended.

18. The method of claim 14, wherein the plurality of queues include a first queue used to write data from a host to the nonvolatile memory and a second queue used to write valid data to be copied for garbage collection of the nonvolatile memory to the nonvolatile memory, the plurality of first weights of the first queue include a first weight corresponding to a program command, and the plurality of first weights of the second queue include a first weight corresponding to a program command, and the method further comprises:

obtaining a ratio of valid data and invalid data which are stored in one or more copy source blocks selected from a plurality of blocks of the nonvolatile memory; and setting each of the first weight corresponding to the program command of the first queue and the first weight corresponding to the program command of the second queue, based on the ratio of the valid data and the invalid data.

19. The method of claim 15, wherein the plurality of queues include a first queue used to write data from a host to the nonvolatile memory and a second queue used to write valid data to be copied for garbage collection of the nonvolatile memory to the nonvolatile memory, and the method further comprising:

obtaining a ratio of valid data and invalid data which are stored in one or more copy source blocks selected from a plurality of blocks of the nonvolatile memory; and setting each of the weight associated with the program command of the first queue and the weight associated with the program command of the second queue, based on the ratio of the valid data and the invalid data.

* * * * *